US009977497B2

(12) United States Patent
Lee et al.

(10) Patent No.: US 9,977,497 B2
(45) Date of Patent: May 22, 2018

(54) METHOD FOR PROVIDING HAPTIC EFFECT SET BY A USER IN A PORTABLE TERMINAL, MACHINE-READABLE STORAGE MEDIUM, AND PORTABLE TERMINAL

(71) Applicant: Samsung Electronics Co., Ltd., Gyeonggi-do (KR)

(72) Inventors: Ju-Youn Lee, Gyeonggi-do (KR); Jin-Hyoung Park, Gangwon-do (KR); Jin-Ha Jun, Seoul (KR)

(73) Assignee: Samsung Electronics Co., Ltd (KR)

( * ) Notice: Subject to any disclaimer, the term of this patent is extended or adjusted under 35 U.S.C. 154(b) by 67 days.

(21) Appl. No.: 14/154,762

(22) Filed: Jan. 14, 2014

(65) Prior Publication Data
US 2014/0198068 A1    Jul. 17, 2014

(30) Foreign Application Priority Data

Jan. 15, 2013  (KR) .................. 10-2013-0004514

(51) Int. Cl.
*G06F 3/041* (2006.01)
*G06F 3/01* (2006.01)
*G06F 3/0488* (2013.01)

(52) U.S. Cl.
CPC .......... *G06F 3/016* (2013.01); *G06F 3/04886* (2013.01); *G06F 2203/014* (2013.01); *G06F 2203/04809* (2013.01)

(58) Field of Classification Search
None
See application file for complete search history.

(56) References Cited

U.S. PATENT DOCUMENTS

| 6,476,834 | B1 * | 11/2002 | Doval ................. G06F 9/4443 715/826 |
| 8,593,409 | B1 * | 11/2013 | Heubel ................. G06F 3/041 340/407.1 |
| 2008/0238635 | A1 | 10/2008 | Klinghult et al. |
| 2008/0294984 | A1 | 11/2008 | Ramsay et al. |
| 2009/0102805 | A1 | 4/2009 | Meijer et al. |
| 2009/0144653 | A1 * | 6/2009 | Ubillos ................. G06F 3/0483 715/800 |

(Continued)

FOREIGN PATENT DOCUMENTS

| CN | 101616213 | 12/2009 | |
| EP | 1406150 A1 * | 4/2004 | ............. G06F 3/016 |

(Continued)

OTHER PUBLICATIONS

European Search Report dated Mar. 16, 2017 issued in counterpart application No. 14151246.7-1972, 8 pages.

(Continued)

*Primary Examiner* — Ilana Spar
*Assistant Examiner* — Kirk Hermann
(74) *Attorney, Agent, or Firm* — The Farrell Law Firm, P.C.

(57) ABSTRACT

A portable terminal and a method for providing a haptic effect in the portable terminal are provided. The method includes displaying an application on a touch screen, detecting a touch in a haptic providing region set by a user, and providing a haptic effect corresponding to the haptic providing region in response to the detected touch.

19 Claims, 25 Drawing Sheets

(56) References Cited

U.S. PATENT DOCUMENTS

| | | | |
|---|---|---|---|
| 2009/0167704 A1* | 7/2009 | Terlizzi | G06F 3/016 |
| | | | 345/173 |
| 2009/0197648 A1 | 8/2009 | Cheon et al. | |
| 2009/0322498 A1* | 12/2009 | Yun et al. | 340/407.2 |
| 2011/0193824 A1 | 8/2011 | Modarres et al. | |
| 2012/0026114 A1 | 2/2012 | Lee et al. | |
| 2012/0105364 A1 | 5/2012 | Klinghult | |
| 2012/0194466 A1 | 8/2012 | Posamentier | |
| 2012/0200509 A1* | 8/2012 | Cheung et al. | 345/173 |
| 2012/0319938 A1* | 12/2012 | Gervais | G06F 3/016 |
| | | | 345/156 |
| 2013/0227411 A1* | 8/2013 | Das | H04M 3/42042 |
| | | | 715/702 |
| 2014/0118127 A1* | 5/2014 | Levesque | G06F 3/016 |
| | | | 340/407.2 |
| 2014/0143726 A1* | 5/2014 | Jones | G06F 3/04886 |
| | | | 715/835 |

FOREIGN PATENT DOCUMENTS

| | | |
|---|---|---|
| EP | 2 138 928 | 12/2009 |
| KR | 100710362 | 4/2007 |
| KR | 1020100000742 | 1/2010 |
| KR | 10-1166529 | 7/2012 |
| RU | 2 461 866 | 9/2012 |

OTHER PUBLICATIONS

Chinese Office Action dated Nov. 17, 2017 issued in counterpart application No. 201410018336.0, 25 pages.

Russian Office Action dated Jan. 11, 2018 issued in counterpart application No. 2015134157/08, 11 pages.

Dictionary.com definition of transformation, http://www.dictionary.com/browse/transformation?s=t, p. 1, Jan. 11, 2018, 6 pages.

Dictionary.com definition of type, http://www.dictionary.com/browse/type?s=t, p. 1, Jan. 11, 2018, 7 pages.

Dictionary.com definition of application, http://www.dictionary.com/browse/application?s=t, p. 1, Jan. 13, 2018, 5 pages.

Dictionary.com definition of detect, http://www.dictionary.com/browse/detect?s=t, p. 1, Jan. 13, 2018, 5 pages.

U.S. Office Action dated Mar. 8, 2018 issued in counterpart U.S. Appl. No. 15/006,795, 69 pages.

* cited by examiner

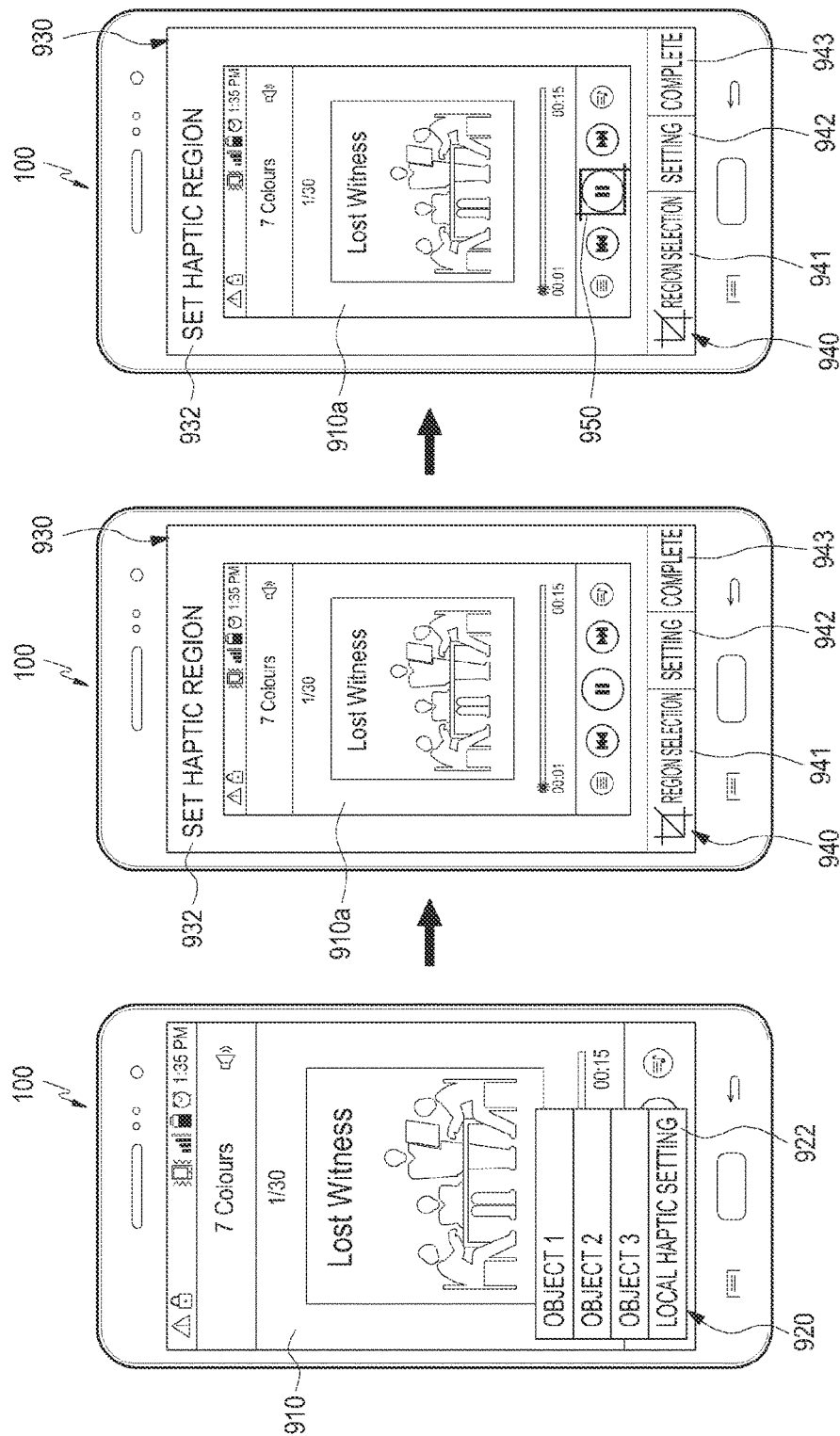

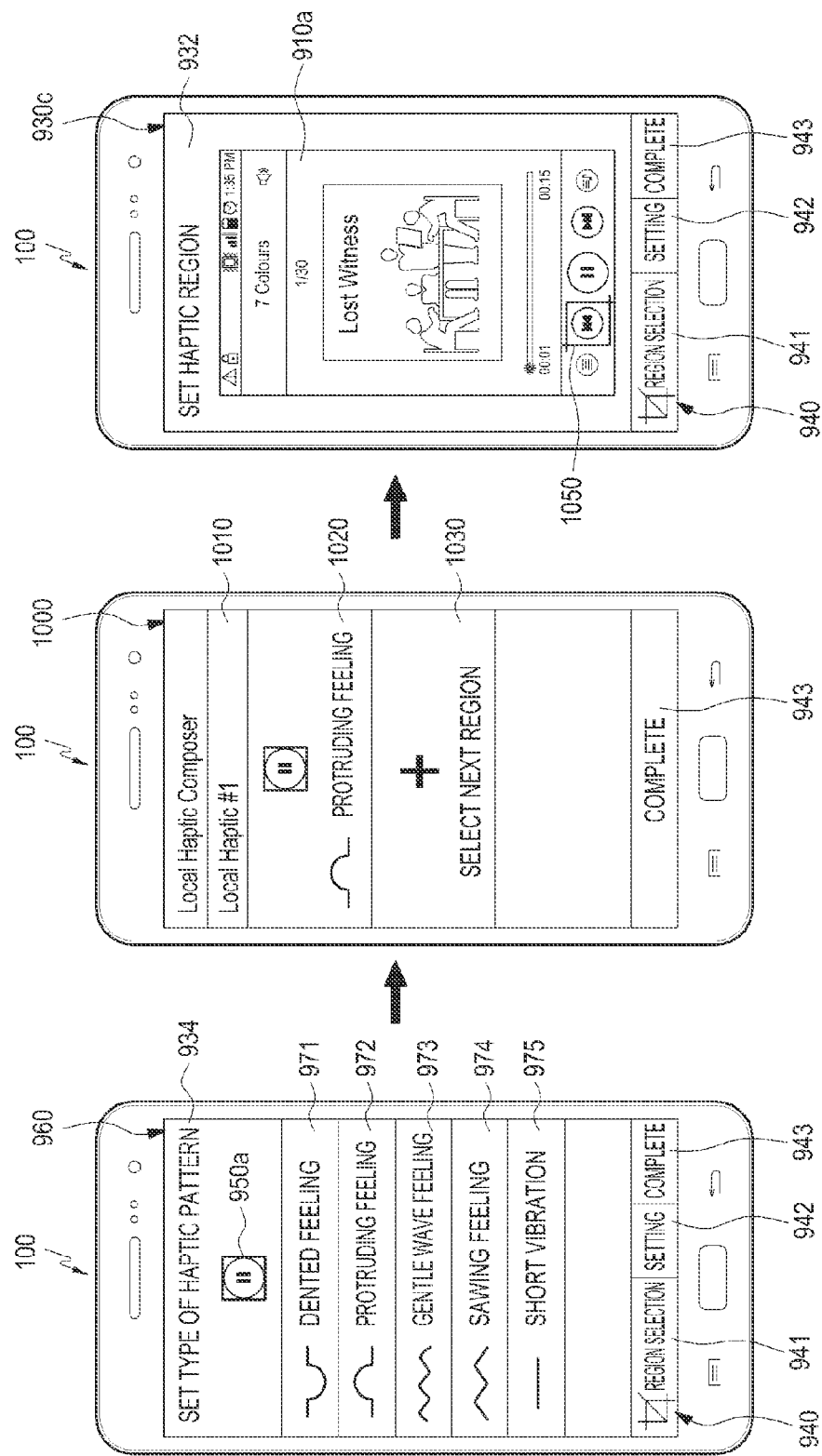

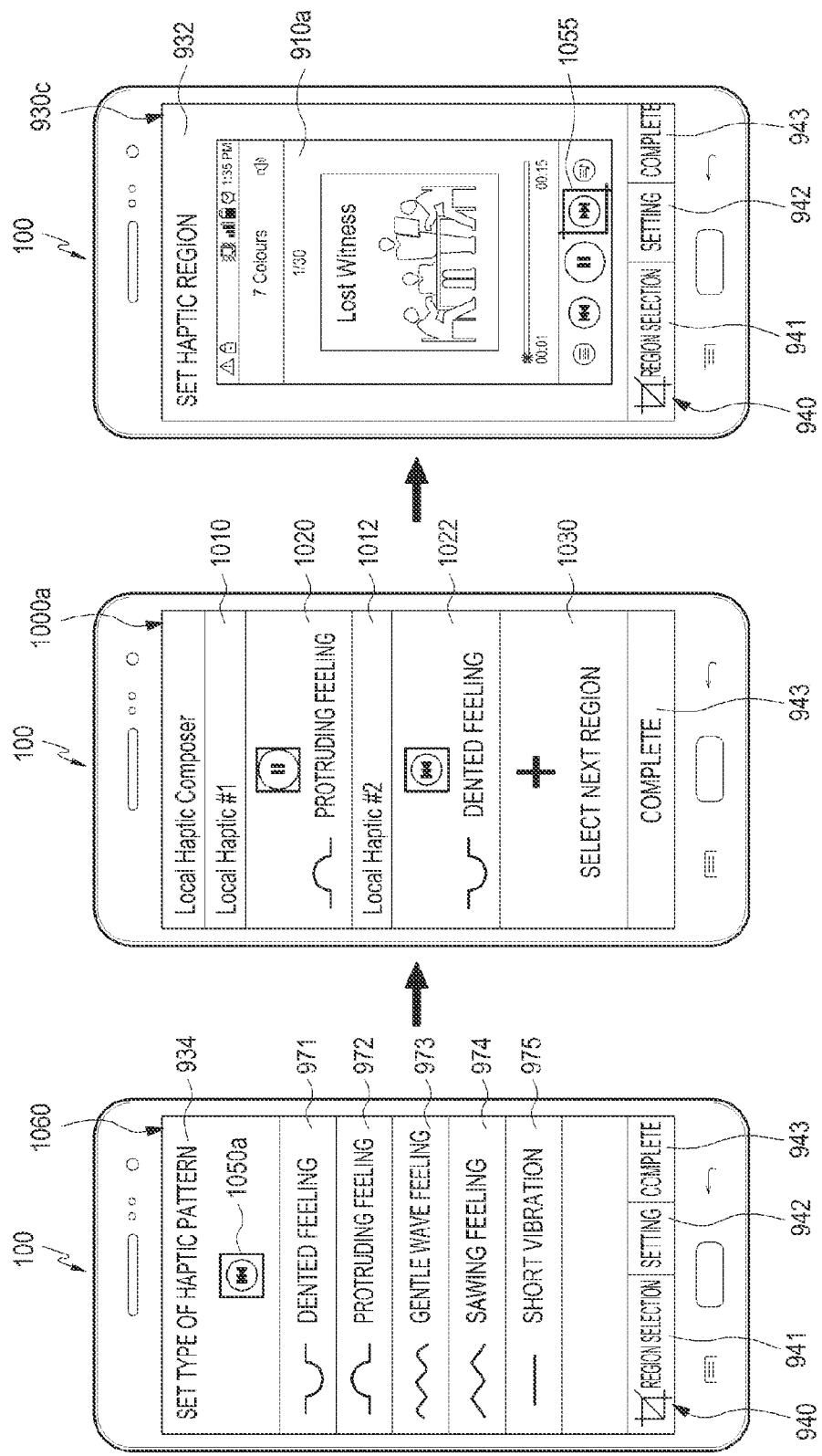

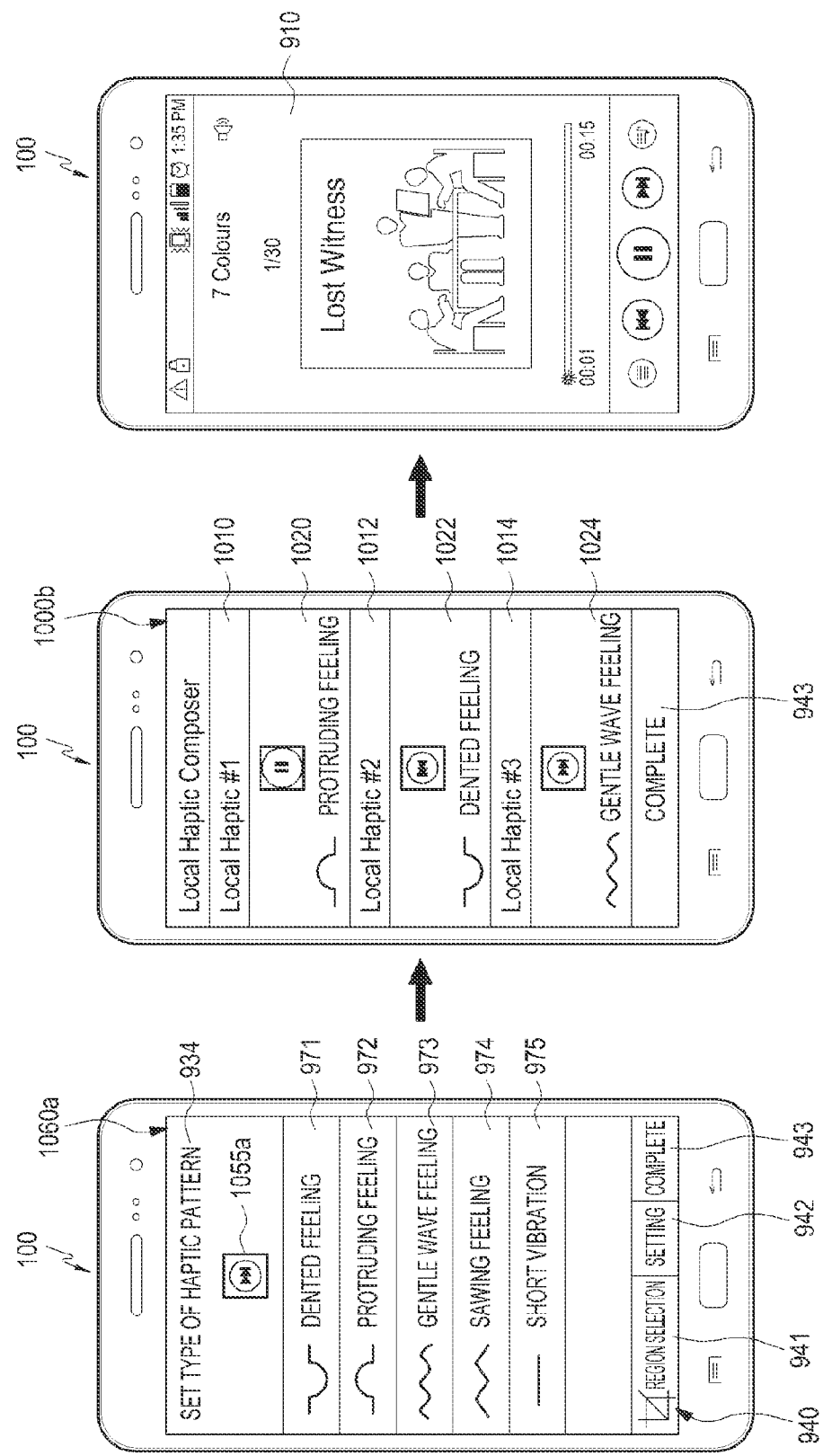

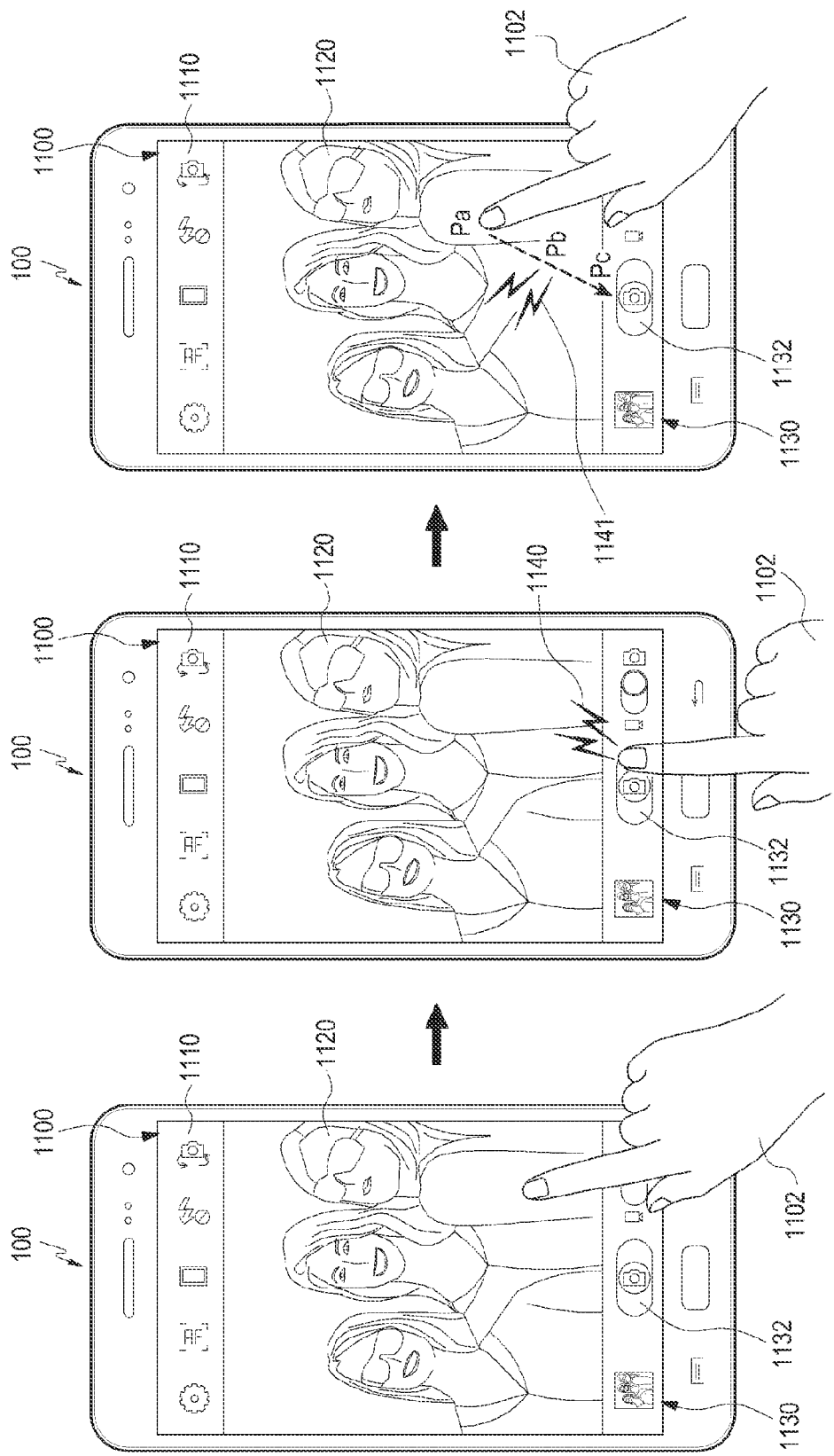

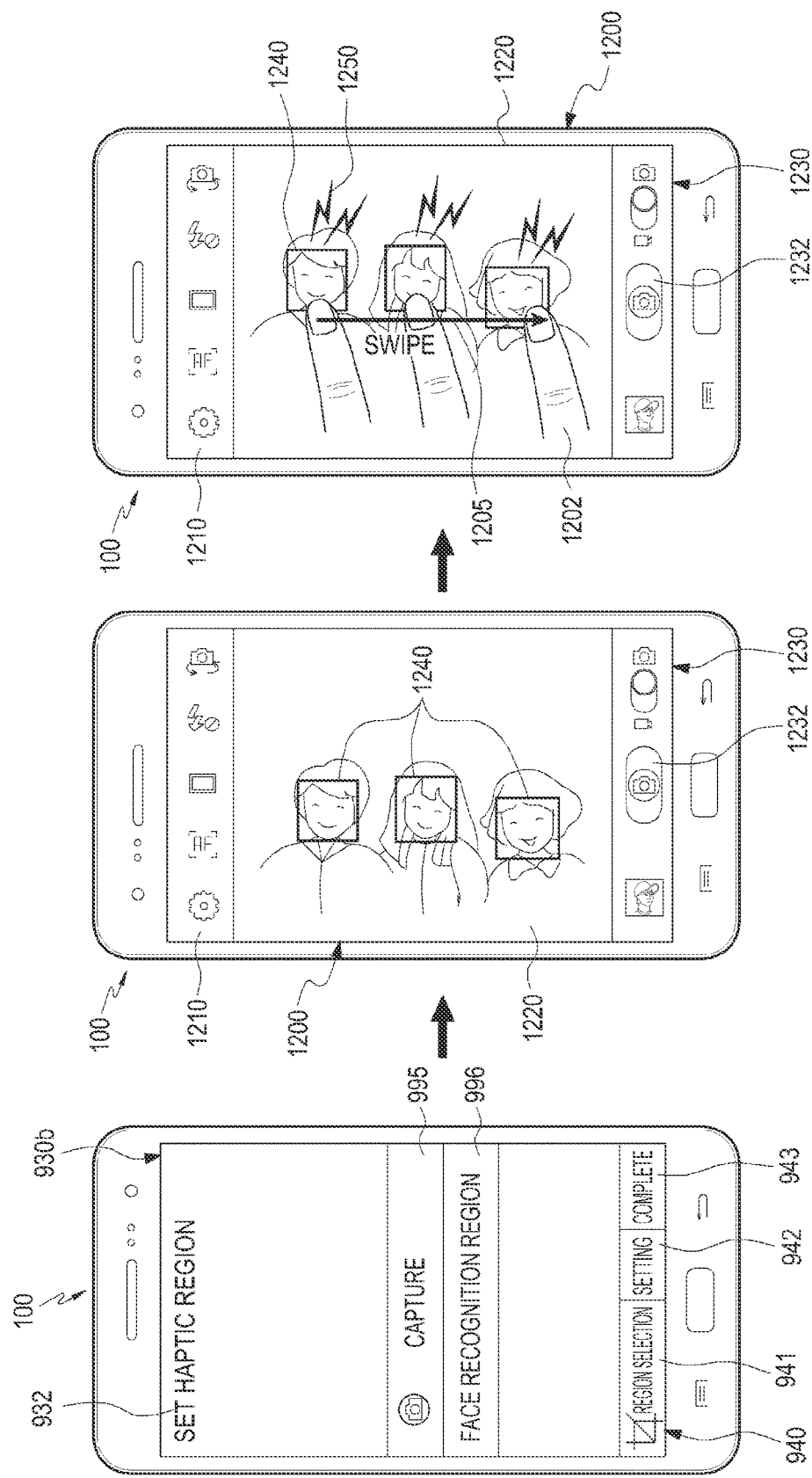

METHOD FOR PROVIDING HAPTIC EFFECT SET BY A USER IN A PORTABLE TERMINAL, MACHINE-READABLE STORAGE MEDIUM, AND PORTABLE TERMINAL

PRIORITY

This application claims priority under 35 U.S.C. § 119(a) to Korean Patent Application Serial No. 10-2013-0004514, which was filed in the Korean Intellectual Property Office on Jan. 15, 2013, the entire disclosure of which is hereby incorporated by reference.

BACKGROUND OF THE INVENTION

1. Field of the Invention

The present invention generally relates to a portable terminal, and more particularly, to a method for providing a haptic effect in a portable terminal.

2. Description of the Related Art

Presently, a plurality of applications may be stored in portable terminals such as, for example, smart phones and tablet Personal Computers (PCs). Objects (i.e., shortcut icons) for executing the respective applications may also be displayed on touch screens of the portable terminals. Hence, the user may execute a desired application in the portable terminal by touching one of the shortcut icons displayed on the touch screen. In addition, visual objects are displayed on the touch screen of the portable terminal in various forms, such as, for example, widgets, pictures, and documents, as well as the shortcut icons.

As such, the portable terminal provides a touch input scheme in which the displayed objects may be touched using an input unit such as, for example, a user's finger, an electronic pen, a stylus pen, etc. As the input scheme, there may be a touch input scheme based on contact with a user's body or a touchable input unit and a non-contact input scheme such as hovering.

Presently, in an input scheme using a touch screen, when a user inputs a touch, a vibration pattern is generated using a vibration element that allows the user to feel as if the user had pressed a button.

However, a user may often want to manipulate an application while not viewing the touch screen of the portable terminal, e.g., when self-capturing. Furthermore, a need exists for an interface which is convenient, especially for blind people.

SUMMARY OF THE INVENTION

The present invention has been made to address at least the problems and disadvantages described above, and to provide at least the advantages described below.

Accordingly, an aspect of the present invention is to provide a method for a user to manipulate an important function of an application, even while not viewing a touch screen of a portable terminal.

According to an aspect of the present invention, a method is provided for generating a haptic effect in a portable terminal. The method includes displaying an application screen on a touch screen, detecting a touch in a haptic-providing region set by a user, and providing a haptic effect corresponding to the haptic-providing region in response to the detected touch, in which the haptic effect is set by the user.

According to another aspect of the present invention, a portable terminal for providing a haptic effect is provided. The portable terminal includes a touch screen for sensing a user input position and outputting an image, a vibration element for generating vibration, and a controller for displaying an application screen on the touch screen, detecting a touch on a haptic-providing region set by a user, and providing a haptic effect corresponding to the haptic-providing region in response to the detected touch, in which the haptic effect is set by the user.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 7A through 15C are diagrams relating to a method for setting a local haptic environment according to an embodiment of the present invention;

FIGS. 20A through 22C are diagrams relating to a method for setting and providing a local haptic region according to an embodiment of the present invention;

FIGS. 23A through 23C are diagrams relating to a method for setting and providing a local haptic region according to an embodiment of the present invention;

DETAILED DESCRIPTION OF THE EMBODIMENTS

Hereinafter, various embodiments of the present invention will be described with reference to the accompanying drawings. In the following description of the present invention, a detailed description of known functions and configurations incorporated herein will be omitted when it may obscure the subject matter of the present invention.

Although ordinal numbers such as "first," "second," and so forth will be used to describe various components of the present invention, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing an embodiment only and is not intended to be limiting of an embodiment. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, unless otherwise indicated the terms are differently defined. It should be understood that terms defined in a generally-used dictionary have meanings coinciding with those of terms in the related technology unless otherwise indicated.

Figure 1:
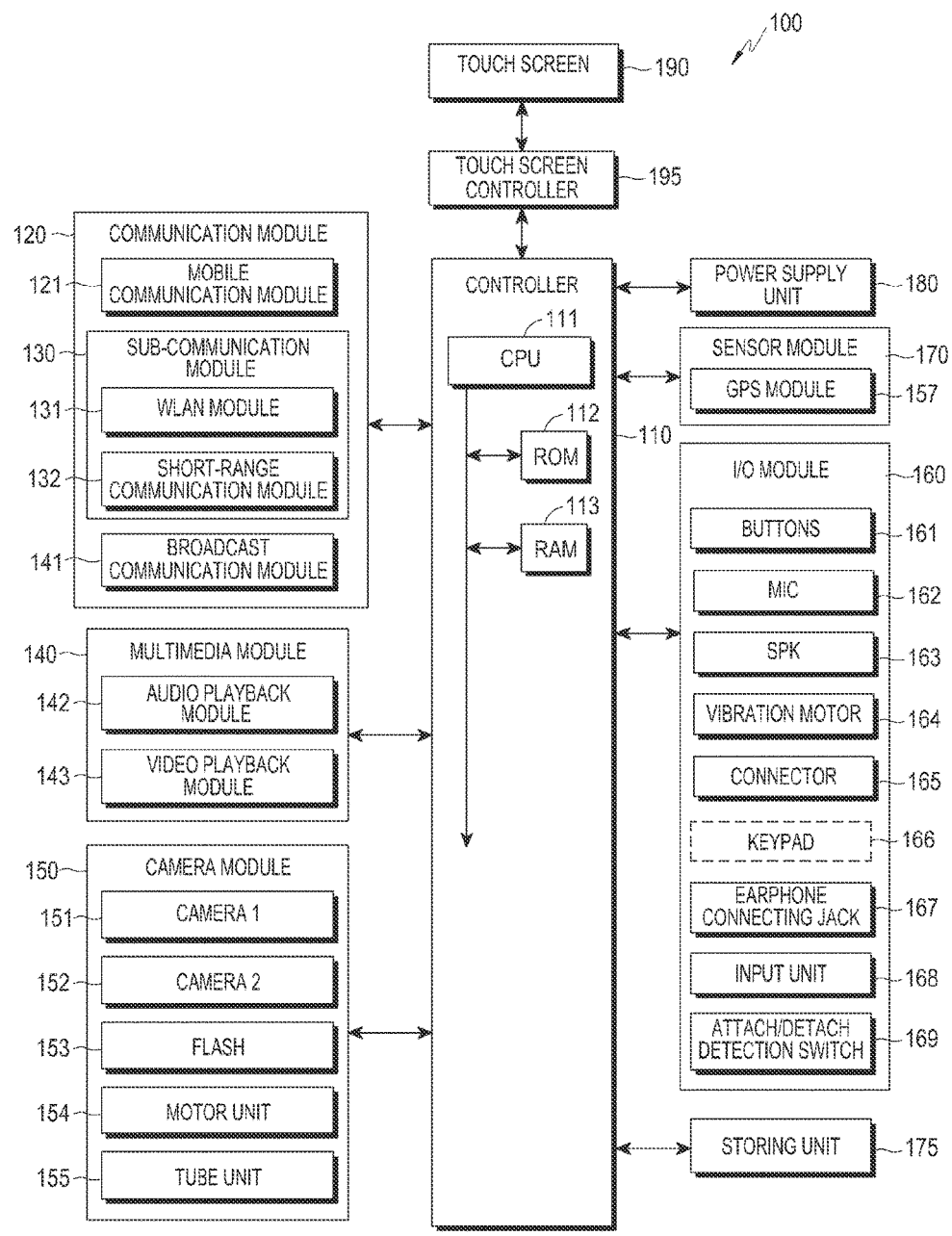
FIG. 1 is a schematic block diagram illustrating a portable terminal which provides a haptic effect according to an embodiment of the present invention.

FIG. 1 is a schematic block diagram illustrating a portable terminal which provides a haptic effect according to an embodiment of the present invention.

Referring to FIG. 1, a portable terminal 100 may be connected with an external electronic device (not illustrated) by using at least one of a communication module 120, a connector 165, and an earphone connecting jack 167. The electronic device may include one of various devices which are removable from the portable terminal 100 and are connectible with the portable terminal 100 in a wired manner, such as, for example, an earphone, an external speaker, a Universal Serial Bus (USB) memory, a charging device, a cradle/dock, a Digital Multimedia Broadcasting (DMB) antenna, a mobile payment-related device, a health management device (a blood pressure monitor or the like), a game console, a vehicle navigation device, and so forth. The electronic device may include a wirelessly connectible Bluetooth communication device, a Near Field Communication (NFC) device, a WiFi Direct communication device, and a wireless Access Point (AP). The portable terminal 100 may be connected with another portable terminal or electronic device such as, for example, one of a cellular phone, a smart phone, a tablet Personal Computer (PC), a desktop PC, and a server, in a wired or wireless manner.

The portable terminal 100 includes a touch screen 190 and a touch screen controller 195. The portable terminal 100 also includes a controller 110, the communication module 120, a multimedia module 140, a camera module 150, an input/output module 160, a sensor module 170, a storing unit 175, and a power supply unit 180.

The communication module 120 includes a mobile communication module 121, a sub communication module 130, and a broadcast communication module 141.

The sub communication module 130 includes a Wireless Local Area Network (WLAN) module 131 and a short-range communication module 132. The multimedia module 140 includes an audio playback module 142 and a video playback module 143. The camera module 150 includes a first camera 151 and a second camera 152. In addition, depending on the primary usage of the portable terminal 100, the camera module 150 of the portable terminal 100, according to the present invention, includes a tube unit 155 for zoom-in/zoom-out operations of the first camera 151 and the second camera 152, a motor 154 for controlling motion of the tube unit 155 for the zoom-in/zoom-out operations of the tube unit 155, and a flash 153 for providing a light source for photographing. The input/output module 160 includes button 161, a microphone 162, a speaker 163, a vibration element 164, a connector 165, and a keypad 166.

The controller 110 includes a Central Processing Unit (CPU) 111, a Read Only Memory (ROM) 112 in which a control program for controlling the portable terminal 100 is stored, and a Random Access Memory (RAM) 113 which memorizes a signal or data input from or output to the CPU 111 or is used as a memory region for a task performed in the portable terminal 100. The CPU 111 may include a single core, a dual core, a triple core, or a quad core processor. The CPU 111, the ROM 112, and the RAM 113 may be interconnected through an internal bus.

The controller 110 controls the communication module 120, the multimedia module 140, the camera module 150, the input/output module 160, the sensor module 170, the storing unit 175, the power supply unit 180, the touch screen 190, and the touch screen controller 195.

The controller 110 senses a user input generated when a touchable user input means, such as an input unit 168, the user's finger, or the like touches one of a plurality of objects displayed on the touch screen 190, approaches the object, or is disposed in proximity to the object. The controller 110 also identifies the object corresponding to the position on the touch screen 190 where the user input is sensed. The user input generated through the touch screen 190 includes one of a direct touch input for directly touching an object and a hovering input, which is an indirect touch input in which the object is approached within a preset recognizing distance but not directly touched. For example, when the input unit 168 is positioned close to the touch screen 190, an object positioned immediately under the input unit 168 may be selected. In the present invention, the user input may include a gesture input generated through the camera module 150, a switch/button input generated through the at least one button 161 or the keypad 166, and a voice input generated through the microphone 162 as well as the user input generated through the touch screen 190.

The object is displayed on the touch screen 190 of the portable terminal 100, and includes at least one of, for example, an application, a menu, a function item, a document, a widget, a picture, a moving image, an e-mail, an SMS message, and an MMS message. The object may be selected, executed, deleted, canceled, stored, and changed using the user input means. The object may be used as a concept including a button, a shortcut icon, a thumbnail image, and a folder including at least one object in the portable terminal 100. In the present invention, a menu indicates an executable function, for example, an icon, a function item, or the like. The function item may be presented in the form of an icon, a text, or the like.

The shortcut icon is displayed on the touch screen 190 of the portable terminal 100 for quick execution of an application or a call, a contact number, a menu, and so forth. Upon input of a command or a selection for executing the shortcut icon, a corresponding application is executed.

The terms "object, function item, and menu," which correspond to a local haptic region of the present invention, include an object, a function item, or a menu in which region setting may be performed by a user. For example, the aforementioned application, document, widget, picture, moving image, e-mail, SMS message, and MMS message may be displayed as icons on a home screen in which the user may perform region setting.

The controller 110 senses a user input event, such as a hovering event, when the input unit 168 approaches the touch screen 190 or is disposed in proximity to the touch screen 190.

Upon generation of a user input event with respect to a preset object or in a preset manner, the controller 110 provides a preset haptic effect corresponding to the generated user input event.

To provide the haptic effect, the controller 110 outputs a control signal to the input unit 168 or the vibration element 164. The control signal may include information about a vibration pattern. Either the input unit 168 or the vibration element 164 generates a vibration corresponding to the vibration pattern. The information about the vibration pattern may indicate either the vibration pattern or an identifier corresponding to the vibration pattern. The control signal may include a vibration generation request alone.

The portable terminal 100 may include at least one of the mobile communication module 121, the WLAN module 131, and the short-range communication module 132.

The mobile communication module 121 may facilitate the connection between the portable terminal 100 and an external electronic device through mobile communication by using one or more antennas (not illustrated) under control of the controller 110. The mobile communication module 121 transmits/receives a wireless signal for a voice call, a video call, a text message (Short Messaging Service: SMS), and/or a multimedia message (Multi Media Service: MMS) with a cellular phone (not illustrated), a smart phone (not illustrated), a tablet PC, or another electronic device (not illustrated) which has a phone number input into the portable terminal 100.

The sub communication module 130 includes the WLAN module 131 and the short-range communication module 132. Alternatively, the sub communication module 130 may include either the WLAN module 131 or the short-range communication module 132, or both.

The WLAN module 131 may be connected to the Internet in a place where a wireless AP (not illustrated) is installed, under control of the controller 110. The WLAN module 131 supports the wireless LAN standard IEEE802.11x of the Institute of Electrical and Electronics Engineers (IEEE). The short-range communication module 132 may wirelessly perform short-range communication between the portable terminal 100 and an external electronic device under control of the controller 110. The short-range communication may include Bluetooth, infrared data association (IrDA), WiFi-Direct communication, NFC communication, or the like.

Through the sub communication module 130, the controller 110 may transmit a control signal for a haptic pattern to the input unit 168.

The broadcast communication module 141 receives a broadcast signal (for example, a TV broadcast signal, a radio broadcast signal, or a data broadcast signal) and broadcast additional information (for example, Electronic Program Guide (EPG) or Electronic Service Guide (ESG)) transmitted from a broadcasting station (not shown) via a broadcast communication antenna (not illustrated) under control of the controller 110.

The multimedia module 140 includes the audio playback module 142 or the video playback module 143. The audio playback module 142 may play a digital audio file (for example, a file having a file extension such as 'mp3', 'wma', 'ogg', or 'way') stored in the storing unit 175 or received under control of the controller 110. The video playback module 143 may play a digital video file (for example, a file having a file extension such as 'mpeg', 'mpg', 'mp4', 'avi', 'mov', or 'mkv') stored or received under control of the controller 110. The multimedia module 140 may be integrated into the controller 110.

The camera module 150 includes the first camera 151 and the second camera 152 which capture a still image or a video under control of the controller 110. The camera module 150 also includes the tube unit 155 for performing the zoom-in/zoom-out operations for photographing, the motor 154 for controlling motion of the tube unit 155, and the flash 153 for providing an auxiliary light source necessary for photographing. The first camera 151 may be positioned on the front surface of the portable terminal 100, and the second camera 152 may be positioned on the rear surface of the portable terminal 100. In another embodiment, the first camera 151 and the second camera 152 may be positioned adjacent to each other (for example, a space between the first camera 151 and the second camera 152 is greater than 1 cm and less than 8 cm) to capture a three-dimensional (3D) still image or a 3D moving image.

The first camera 151 and the second camera 152 each include a lens system, an image sensor, and so forth. The first camera 151 and the second camera 152 convert an optical signal (input or captured) through the lens systems into an electric image signal and output the electric image signal to the controller 110. The user may capture a moving image or a still image through the first camera 151 and the second camera 152.

The input/output module 160 includes the at least one button 161, the microphone 162, the speaker 163, the vibration element 164, the connector 165, the keypad 166, the earphone connecting jack 167, and the input unit 168. However, it should be noted that the input/output module 160 is not limited to those examples, and a cursor control such as, for example, a mouse, a track ball, a joy stick, or a cursor direction key may be provided to control movement of a cursor on the touch screen 190.

The buttons 161 may be formed on at least one of a front surface, a side surface, and a rear surface of a housing (or case) of the portable terminal 100, and may include at least one of a power/lock button, a volume button, a menu button, a home button, a back button, and a search button.

The microphone 162 receives voice or sound and generates a corresponding electric signal under control of the controller 110.

The speaker 163 outputs sound corresponding to various signals or data (for example, wireless data, broadcast data, digital audio data, digital video data, or the like) under control of the controller 110. The speaker 163 may output sound corresponding to a function executed by the portable terminal 100 (for example, button manipulation sound, a ring back tone, or voice of a counterpart user corresponding to a phone call). One or more speakers 163 may be formed in a proper position or proper positions of the housing of the portable terminal 100.

The vibration element 164 converts an electric signal into mechanical vibration under control of the controller 110. For example, in the portable terminal 100, in a vibration mode, if a voice call or a video call from another device (not illustrated) is received, the vibration element 164 operates.

One or more of the vibration element 164 may be disposed in the housing of the portable terminal 100. The vibration element 164 may operate in response to user input generated through the touch screen 190.

The connector 165 may be used as an interface for connecting the portable terminal 100 with an external electronic device (not illustrated) or a power source (not illustrated). Under control of the controller 110, data stored in the storing unit 175 of the portable terminal 100 may be transmitted to an external electronic device or data may be received from the external electronic device through a wired cable connected to the connector 165. The portable terminal 100 receives power from the power source through the wired cable connected to the connector 165 or may charge a battery (not illustrated) by using the power source.

The keypad 166 receives key input from the user for control of the portable terminal 100. The keypad 166 includes a physical keypad (not illustrated) formed in the portable terminal 100 or a virtual keypad (not illustrated) displayed on the touch screen 190. The physical keypad (not illustrated) formed in the mobile portable terminal 100 may be excluded according to the capability or structure of the portable terminal 100.

An earphone (not illustrated) may be inserted into the earphone connecting jack 167 to be connected to the portable terminal 100.

The input unit 168 may be inserted into the portable terminal 100 for keeping, and when being used, may be withdrawn or separated from the portable terminal 100. In a region of an inner side of the portable terminal 100 into which the input unit 168 is inserted, an attach/detach recognition switch 169 is disposed to provide a signal corresponding to attachment or detachment of the input unit 168 to the controller 110. The attach/detach recognition switch 169 may be configured to directly or indirectly contact the input unit 168 when the input unit 168 is mounted. Thus, the attach/detach recognition switch 169 generates the signal corresponding to attachment or separation of the input unit 168 (that is, a signal for indicating the attachment or detachment of the input unit 168) based on whether it contacts the input unit 168, and outputs the signal to the controller 110.

The sensor module 170 includes at least one sensor for detecting a state of the portable terminal 100. For example, the sensor module 170 may include at least one of a proximity sensor for detecting the user's proximity with respect to the portable terminal 100, an illumination sensor (not illustrated) for detecting an amount of light around the portable terminal 100, a motion sensor (not illustrated) for detecting an operation of the portable terminal 100 (for example, rotation of the portable terminal 100 or acceleration or vibration applied to the portable terminal 100), a geo-magnetic sensor (not illustrated) for detecting an orientation of the portable terminal 100 by using the Earth's magnetic field, a gravity sensor for detecting a working direction of the gravity, an altimeter for measuring an atmospheric pressure to detect an altitude, and a Global Positioning System (GPS) module 157.

The GPS module 157 receives electric waves from a plurality of GPS satellites (not illustrated) in the Earth's orbit, and calculates a location of the portable terminal 100 by using a time of arrival from the GPS satellite (not illustrated) to the portable terminal 100.

The storing unit 175 stores a signal or data which is input/output corresponding to operations of the communication module 120, the multimedia module 140, the input/output module 160, the sensor module 170, or the touch screen 190, under control of the controller 110. The storing unit 175 may also store a control program and applications for control of the portable terminal 100 and/or the controller 110.

The term "storing unit" includes the storing unit 175, the ROM 112 and the RAM 113 in the controller 110, or a memory card (not illustrated) mounted in the portable terminal 100 (for example, a Secure Digital (SD) card, a memory stick). The storing unit 175 may include a non-volatile memory, a volatile memory, a Hard Disk Drive (HDD), or a Solid State Drive (SSD).

The storing unit 175 may also store applications of various functions such as navigation, video communication, games, an alarm application based on time, images for providing a Graphic User Interface (GUI) related to the applications, user information, documents, databases or data related to a method for processing touch inputs, background images (e.g., a menu screen, a standby screen, and so forth), operation programs necessary for driving the portable terminal 100, and images captured by the camera module 150. The storing unit 175 is a machine, such as, for example, a non-transitory computer-readable medium. The term "machine-readable medium" includes a medium for providing data to the machine to allow the machine to execute a particular function. The storing unit 175 may include non-volatile media or volatile media. Such a medium needs to be of a tangible type so that commands recorded on the medium can be detected by a physical tool which reads the commands with the machine.

The machine-readable medium may include, but is not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash EPROM.

The power supply unit 180 supplies power to one or more batteries disposed in the housing of the portable terminal 100 under control of the controller 110. The one or more batteries supply power to the portable terminal 100. The power supply unit 180 may also supply power input from an external power source through the wired cable connected with the connector 165 to the portable terminal 100. The power supply unit 180 may also supply power, which is wirelessly input from an external power source using a wireless charging technique, to the portable terminal 100.

The portable terminal 100 includes the touch screen 190 which provides a user graphic interface corresponding to various services (for example, call, data transmission, broadcasting, picture taking) to users.

The touch screen 190 outputs an analog signal, which corresponds to at least one input to the user graphic interface, to the touch screen controller 195.

The touch screen 190 receives at least one user inputs through a user's body (for example, a finger including a thumb) or the input unit 168 (for example, a stylus pen or an electronic pen).

The touch screen 190 also receives a continuous movement of one touch (i.e., a drag input). The touch screen 190 outputs an analog signal corresponding to the received continuous movement of the touch to the touch screen controller 195.

In the present invention, a touch may also include a non-contact touch (for example, when the user input means is positioned within a distance of, for example, 1 cm) in which the user input means may be detected without a direct contact with the touch screen 190. The touch may also include a direct contact between the touch screen 190 and a finger or the input unit 168. A distance or interval from the touch screen 190 within which the user input means may be detected may be changed according to the capability or structure of the portable terminal 100. In particular, to separately detect a direct touch event based on a contact with the user input means and an indirect touch event (i.e., a hovering event), the touch screen 190 may be configured to output different values for values (for example, an analog voltage value or current value) detected in the direct touch event and the hovering event.

The touch screen 190 may be implemented as, for example, a resistive type, a capacitive type, an infrared type, an acoustic wave type, or a combination thereof.

The touch screen 190 may include at least two touch panels capable of sensing a touch, an approach of a finger, or the input unit 168 to receive inputs generated by the finger or the input unit 168. The at least two touch panels provide different output values to the touch screen controller 195. Thus, the touch screen controller 195 differently recognizes the values input from the at least two touch screen panels to identify whether the input from the touch screen 190 is the input generated by the finger or by the input unit 168.

The touch screen controller 195 converts the analog signal received from the touch screen 190 into a digital signal and transmits the digital signal to the controller 110. The controller 110 controls the touch screen 190 by using the digital signal received from the touch screen controller 195. For example, the controller 110 may control a shortcut icon (not illustrated) displayed on the touch screen 190 to be selected or executed in response to a direct touch event or a hovering event. The touch screen controller 195 may be included in the controller 110.

The touch screen controller 195, by detecting a value (for example, an electric-current value) output through the touch screen 190, recognizes a hovering interval or distance as well as a user input position and converts the recognized distance into a digital signal (for example, a Z coordinate), which it then sends to the controller 110. The touch screen controller 195 may also, by detecting the value output through the touch screen 190, detect a pressure applied by the user input means to the touch screen 190, convert the detected pressure into a digital signal, and provide the digital signal to the controller 110.

Figure 2:
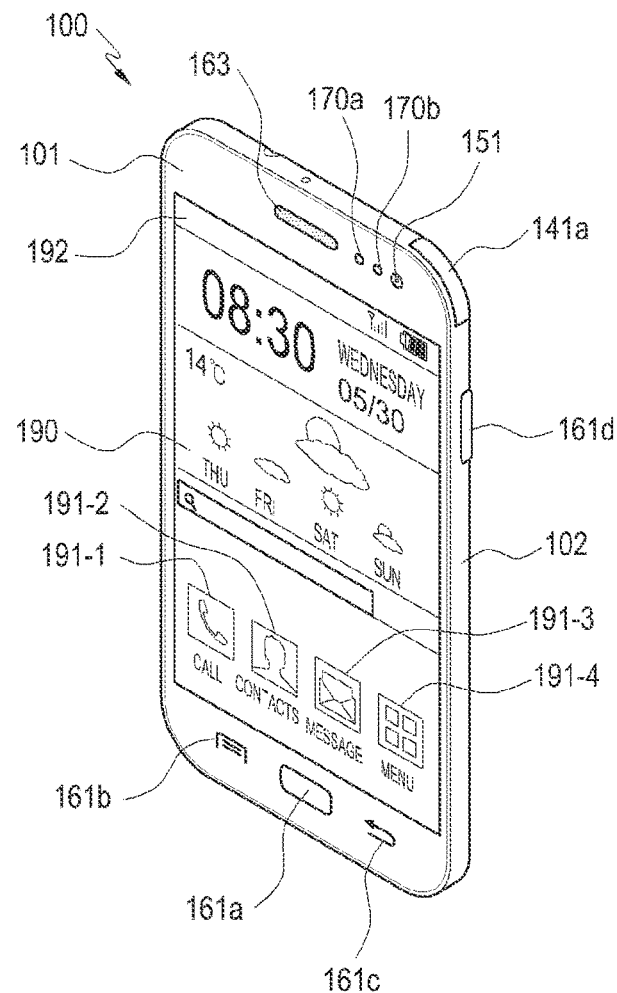
FIG. 2 is a front perspective view illustrating a portable terminal according to an embodiment of the present invention.
Figure 3:
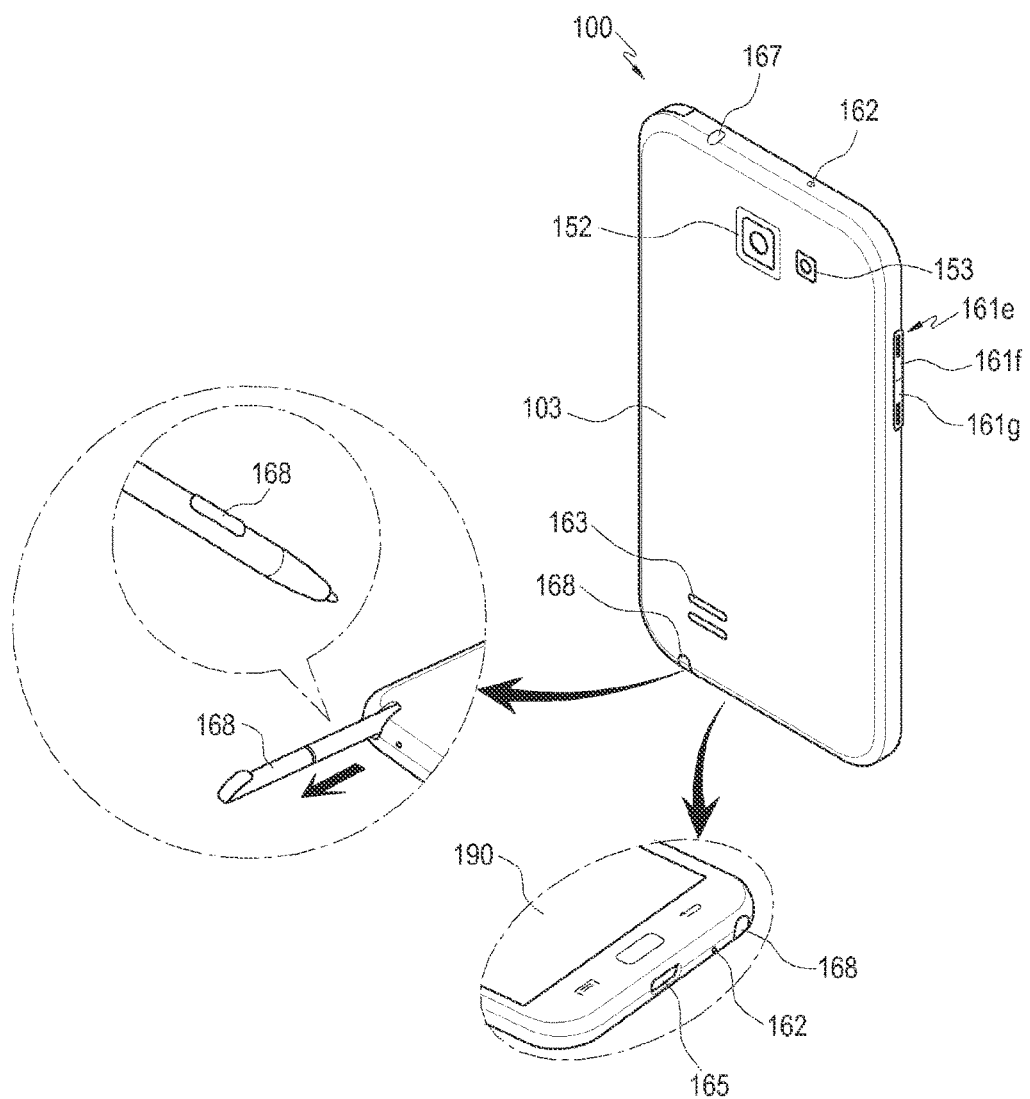
FIG. 3 is a rear perspective view illustrating a portable terminal according to an embodiment of the present invention.

FIG. 2 is a front perspective view of the portable terminal 100 according to an embodiment of the present invention, and FIG. 3 is a rear perspective view of the portable terminal 100 according to an embodiment of the present invention.

Referring to FIGS. 2 and 3, the touch screen 190 is disposed in the center of a front surface 101 of the portable terminal 100. The touch screen 190 may be large enough to occupy most of the front surface 101 of the portable terminal 100. FIG. 2 shows an example in which a main home screen is displayed on the touch screen 190. The main home screen is an initial screen displayed on the touch screen 190 when the portable terminal 100 is powered on. When the portable terminal 100 has different home screens of several pages, the main home screen may be the first home screen among the home screens of the several pages. Shortcut icons 191-1, 191-2, and 191-3 for executing frequently used applications, a main menu change key 191-4, time, weather, and so forth may be displayed on the home screen. If the user selects the main menu change key 191-4, a menu screen is displayed on the touch screen 190. A status bar 192 indicating a state of the portable terminal 100, such as a battery charge state, a strength of a received signal, and a current time, may be formed in an upper portion of the touch screen 190.

In a lower portion of the touch screen 190, a home button 161a, a menu button 161b, and a back button 161c may be disposed.

The home button 161a is intended to display the main home screen on the touch screen 190. For example, when any home screen, which is different from the main home screen, or a menu screen is displayed on the touch screen 190, the main home screen may be displayed on the touch screen 190 upon selection of the home button 161a. If the home button 161a is selected during execution of applications on the touch screen 190, the main home screen illustrated in FIG. 2 may be displayed on the touch screen 190. The home button 161a may be used to display recently used applications or a task manager on the touch screen 190.

The menu button 161b provides a connection menu which may be displayed on the touch screen 190. The connection menu may include, for example, a widget add menu, a background change menu, a search menu, an edit menu, and an environment setting (or configuration) menu.

The back button 161c may be used to display a screen which was displayed immediately before the currently executed screen or to terminate the most recently used application.

The first camera 151, an illumination sensor 170a, and a proximity sensor 170b may be disposed on an edge of the front surface 101 of the portable terminal 100. The second camera 152, the flash 153, and the speaker 163 may be disposed on a rear surface 103 of the portable terminal 100.

A power/lock button 161d, a volume button 161e including a volume-up button 161f and a volume-down button 161g, a terrestrial DMB antenna 141a for broadcasting reception, and one or more microphones 162 may be disposed on a lateral surface 102 of the portable terminal 102. The DMB antenna 141a may be fixed to or removable from the portable terminal 100.

The connector 165, in which multiple electrodes are formed and may be connected with an external device in a wired manner, may be formed in a lower-end lateral surface of the portable terminal 100. The earphone connecting jack 167, into which the earphone may be inserted, may be formed in an upper-end lateral surface of the portable terminal 100.

The input unit 168, which may be stored by being inserted into the portable terminal 100 and may be withdrawn and separated from the portable terminal 100 for use, may be mounted/formed on the lower-end lateral surface of the portable terminal 100.

Figure 4:
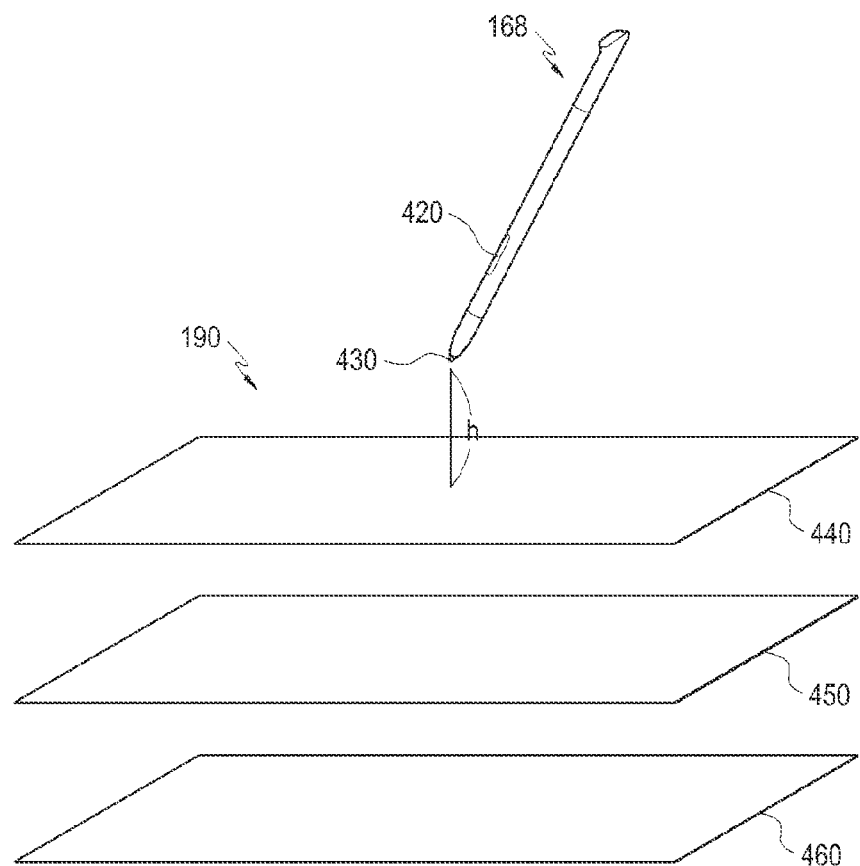
FIG. 4 is a diagram illustrating a touch screen according to an embodiment of the present invention.

FIG. 4 illustrates the touch screen 190 according to an embodiment of the present invention.

Referring to FIG. 4, the touch screen 190 includes a first touch panel 440 for sensing a finger input, a display panel 450 for screen display, and a second touch panel 460 for sensing a pen input are sequentially stacked from top to bottom by being closely adhered to one another or at least partially spaced apart from one another. The first touch panel 440 may also be disposed under the display panel 450.

The display panel 450 includes multiple pixels and displays an image through these pixels. For the display panel 450, a Liquid Crystal Display (LCD), an Organic Light Emitting Diode (OLED), or an LED may be used. The display panel 450 displays various operation states of the portable terminal 100, various images corresponding to execution of applications or services, and a plurality of objects.

The first touch panel 440 may include a window exposed on the front surface of the portable terminal 100 and a sensor layer attached to a bottom surface of the window to recognize information (e.g., position, strength, or the like) of the finger input. The sensor layer forms a sensor for recognizing a position of a finger contact on the surface of the window, and to this end, the sensor layer has preset patterns. The sensor layer may have various patterns such as, for example, a linear latticed pattern, a diamond-shape pattern, and so forth. To perform a sensor function, a scan signal having a preset waveform is applied to the sensor layer, and if the finger contacts the surface of the window, a sensing signal whose waveform is changed by a capacitance between the sensor layer and the finger is generated. The controller 110 analyzes the sensing signal, thereby recognizing whether and where the finger contacts the surface of the window.

In another embodiment, the first touch panel 440 may be a panel which is manufactured by a) coating a thin metallic conductive material (for example, an Indium Tin Oxide (ITO) layer, or the like) onto both surfaces of the window to allow electric current to flow on the surface of the window and b) coating a dielectric, which is capable of storing electric charges, onto the coated surfaces. Once the finger touches the surface of the first touch panel 440, a predetermined amount of electric charges moves to the touched position by static electricity, and the first touch panel 440 recognizes the amount of change of current corresponding to movement of the electric charges, thus sensing the touched position.

Any type of touches capable of generating static electricity may be sensed through the first touch panel 440.

The second touch panel 460 is a touch panel of an Electromagnetic Resonance (EMR), and may include an electromagnetic induction coil sensor having a grid structure in which a plurality of loop coils intersect one another and an electronic signal processor for sequentially providing an alternating current signal having a predetermined frequency to the respective loop coils of the electromagnetic induction coil sensor. If the input unit 168 having a resonance circuit embedded therein is brought near the loop coil of the second touch panel 460, a signal transmitted from the loop coil generates electric current based on mutual electromagnetic induction in the resonance circuit of the input unit 168. Based on the electric current, the resonance circuit of the input unit 168 generates and outputs an induction signal. Then, the second touch panel 460 detects the induction signal by using the loop coil, thus sensing an input position (i.e., a hovering input position or a direct touch position) of the input unit 168. The second touch panel 460 may also sense a height h from the surface of the touch screen 190 to a pen point 430 of the input unit 168. The induction signal output from the input unit 168 may have a frequency which varies according to a pressure applied by the input unit 168 to the surface of the touch screen 190. Based on the frequency, the pressure (i.e., a pen pressure) of the input unit 168 may be sensed.

An input means capable of generating electric current based on electromagnetic induction may be sensed through the second touch panel 460.

Figure 5:
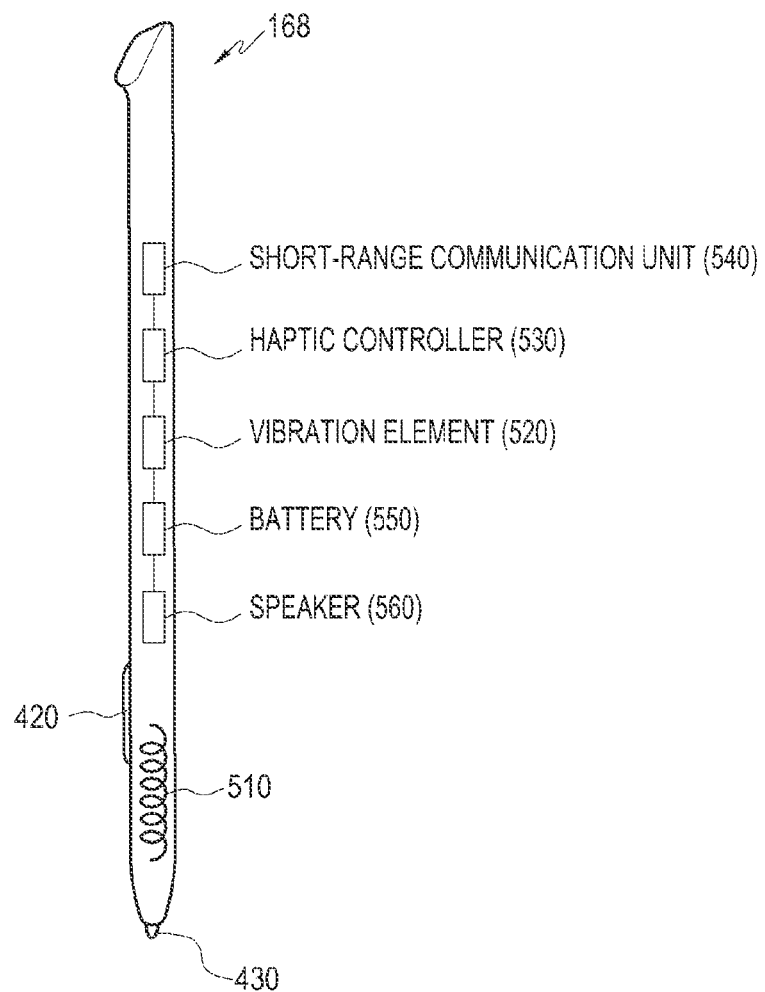
FIG. 5 is a diagram illustrating an input unit according to an embodiment of the present invention.

FIG. 5 illustrates the input unit 168 according to an embodiment of the present invention.

Referring to FIG. 5, the input unit (for example, a touch pen) 168 includes a) a penholder, the pen point 430 disposed at the end of the penholder, b) a button 420 capable of changing an electromagnetic induction value generated by a coil 510 disposed inside the penholder adjacent to the pen point 430, c) a vibration element 520 which vibrates when a hovering input effect is generated, d) a haptic controller 530 for analyzing a control signal received from the portable terminal 100 due to hovering with the portable terminal and controlling vibration strength and interval of the vibration element 520 to provide a haptic effect corresponding to the analysis result to the input unit 168, e) a short-range communication unit 540 for performing short-range communication with the portable terminal 100, and f) a battery 550 for supplying power for vibration of the input unit 168. The input unit 168 may also include a speaker 560 for outputting sound corresponding to vibration interval and/or vibration strength of the input unit 168. The speaker 560 may output sound corresponding to the haptic effect provided to the input unit 168 simultaneously with or a predetermined time (for example, 10 ms) before/after the haptic effect.

More specifically, the speaker 560 outputs sound corresponding to various signals (for example, a wireless signal, a broadcast signal, a digital audio file, or a digital moving image file) of the mobile communication module 120, the sub communication module 130, or the multimedia module 140 provided in the portable terminal 100 under control of the haptic controller 530. The speaker 560 outputs sound (for example, button manipulation sound or a ring back tone corresponding to a phone call) corresponding to a function executed by the portable terminal 100, and one or more of the speaker 560 may be formed in predetermined areas of a housing of the input unit 168.

When the pen point 530 contacts the touch screen 190 or is placed in a position (for example, within 5 mm) in which hovering may be sensed, then the haptic controller 530 analyzes at least one control signal received from the portable terminal 100 through the short-range communication unit 540 and controls the vibration interval and strength of the vibration element 520 provided in the input unit 168 according to the analyzed control signals. The short-range communication unit 540 and the vibration element 520 have already been activated prior to reception of the control signals. The control signal is transmitted by the portable terminal 100 and may be transmitted to the input unit 168 repetitively at predetermined intervals (for example, every 5 ms). That is, when the pen point 430 contacts the touch screen 190, then the portable terminal 100 recognizes an object (or an icon) on the touch screen 190, which is pointed to by the pen point 430, and transmits a control signal generated according to a haptic pattern assigned to the object to the short-range communication unit 540 provided in the input unit 168.

The control signal may be transmitted to the input unit 168 by at least one of the mobile communication module 120 and the sub communication module 130. The control signal includes at least one of information for activating the vibration element 520 of the input unit 168, information indicating vibration strength of the input unit 168, information for deactivating the vibration element 520 of the input unit 168, and information indicating a total time during which the haptic effect is provided. The control signal has a predetermined size of, for example, about 8 bits, and is repetitively transmitted at predetermined intervals (for example, 5 ms) to control vibration of the input unit 168, such that the user may recognize that the vibration corresponding to the haptic effect is repetitively generated at predetermined intervals. For example, the control signal may include information provided in Table 1.

TABLE 1

| Field | Vibration Element Activation | Vibration Strength | Vibration Element Deactivation |
|---|---|---|---|
| Information | 1 | 125 125 131 131 0 | 2 |

In Table 1, the control signal includes information for activating the vibration element 520 of the input unit 168, information indicating vibration strength of the vibration element 520, and information for deactivating the vibration element 520. The control signal may be transmitted to the input unit 168 every 5 ms, but this is merely an example and a timing of the transmission of the control signal may be variable according to an interval of the haptic pattern. In addition, transmission interval and transmission period of the control signal may also be variable. The transmission period may last until a temporary touch or a continuous touch of the input unit 168 on the touch screen 190 is terminated.

The input unit 168, structured as described above, supports an electromagnetic induction scheme. If a magnetic field is formed in a predetermined position of the touch screen 190 by the coil 510, the touch screen 190 detects a corresponding magnetic field position and recognizes a touch position. If the pen point 430 is adjacent to or touches the touch screen 190 resulting in a user input event, the portable terminal 100 identifies an object corresponding to a user input position and transmits a control signal indicating a haptic pattern, which is preset in the identified object, to the input unit 168.

In accordance with an embodiment of the present invention, a method is provided for setting a local haptic effect in a region or object of an application selected by a user, for the application selected by the user among various applications (including a home screen) provided by the portable terminal 100. In the present invention, the "local haptic" refers to a vibration that is provided for a region of an application screen.

By using the local haptic, a method is provided for a user to easily select a desired object without viewing a screen.

The controller 110 controls the overall operation of the portable terminal 100 as well as other components in the portable terminal 100 to perform the disclosed method for providing the local haptic.

Figure 6:
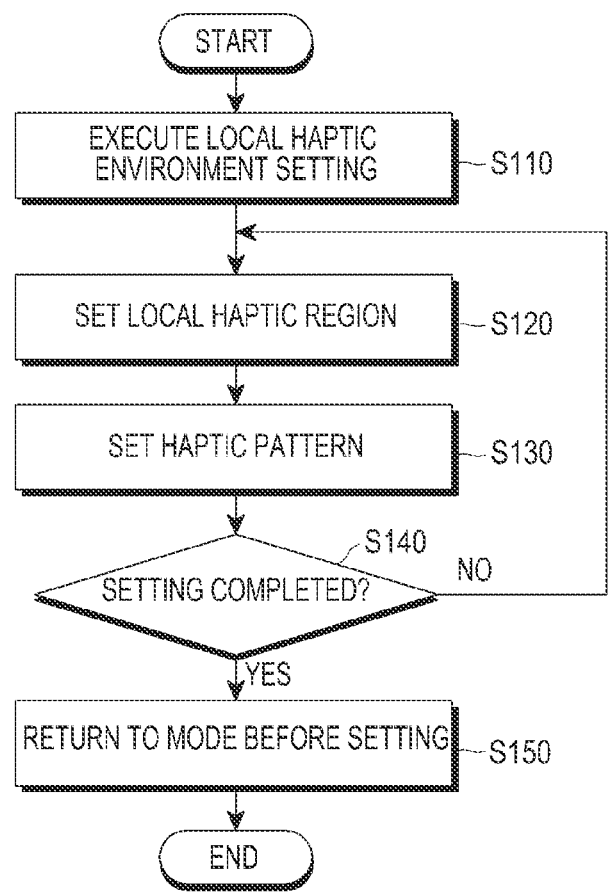
FIG. 6 is a flowchart illustrating a method for setting a local haptic environment according to an embodiment of the present invention.

FIG. 6 is a flowchart for illustrating a method for setting a local haptic environment according to an embodiment of the present invention, and FIGS. 7 through 15 are diagrams for describing a method for setting a local haptic environment according to an embodiment of the present invention.

The method for setting a local haptic environment includes steps S110 through S150.

Step S110 includes execution of the local haptic environment setting, in which the user may set a local haptic condition and effect by selecting and executing the local haptic environment setting.

Execution of the local haptic environment setting may be implemented in various ways.

The portable terminal illustrated in the following drawings may have the same structure and functionality as the portable terminal 100 illustrated in FIGS. 1 through 3, although an appearance of the portable terminal appears different than that of FIGS. 1 through 3.

Referring to FIG. 7A, the user selects local haptic environment setting 922 in environment setting 920 displayed on a music/video application screen 910.

Step S120 includes setting a local haptic region, in which the user sets a local haptic region (that is, a haptic providing region) on a screen of an application on which a local haptic effect is to be provided.

Upon selection of the local haptic environment setting 922, a local haptic environment setting screen 930 is displayed as illustrated in FIG. 7B. The local haptic environment setting screen 930 displays a representative image 910a of the music/video application in a size-reduced form. The local haptic environment setting screen 930 also displays a phrase 932 for guiding selection of the local haptic region such as, for example, a sentence stating "Set a haptic region." and a menu (i.e., a local haptic environment setting menu) 940. The representative image 910a is a size-reduced image of the music/video application screen 910 illustrated in FIG. 7A. The music/video application screen 910 may be displayed in a form in which a width and/or a length are reduced. The environment setting menu 940 includes a region selection menu 941 for the user's designation of a local haptic region, a setting menu 942 for completion of a selection of the local haptic region, and a complete menu 943 for completing the local haptic environment setting. The user may designate a start position and an end position of the local haptic region, thus selecting the local haptic region. The representative image 910a has been previously stored in the storing unit 175.

Referring to FIG. 7C, the user selects the region selection menu 941 in the environment setting menu 940 and sets a desired region. In the current example, the user sets a pause/play button to a first local haptic region 950. Thereafter, the user executes a haptic pattern setting step by selecting the setting menu 942 in the environment setting menu 940. In this example, the local haptic region is mapped to a menu. The local haptic region may be larger, smaller, or to the same size as an area occupied by an object. The local haptic region may be positioned on a circumference of an object or may at least partially overlap with the object. For example, if the first local haptic region 950 has a quadrilateral shape, coordinates of diagonal corners of the first local haptic region 950 (i.e., (x1, y1) and (x2, y2) coordinates) may be stored in the storing unit 175. In the present invention, the local haptic region may have the shape of a quadrilateral, a triangle, a circle, and/or an oval, and coordinates which define these various shapes may be stored in the storing unit 175. In the present invention, the local haptic region may have a size which is the same as or different from that of a function item. For example, if a function item is an icon, when the local haptic region is designated as a quadrilateral shape, the local haptic region may be larger or smaller than the icon. Also, in the present invention, the local haptic region may be set in an Operating System (OS), an application such as a music/video application, or a shortcut icon of a home screen.

Step S130 includes setting a haptic pattern, in which the user sets the haptic pattern to be applied to the selected first local haptic region 950.

Referring to FIG. 8A, upon selection of the setting menu 942, a haptic pattern setting screen 960 is displayed. An image 950a, selected as the first local haptic region 950, together with a guide phrase 934 stating "Set a type of a haptic pattern", is displayed on the haptic pattern setting screen 960. Selectable first through fifth haptic patterns 971, 972, 973, 974, and 975 are also displayed on the haptic pattern setting screen 960. In the current example, the first through fifth haptic patterns 971, 972, 973, 974, and 975 are illustrated, and the user selects a second haptic pattern for the first local haptic region 950. Each haptic pattern may be displayed as an image indicating a change of vibration strength over time and a text describing the image.

FIGS. 9A through 13B are diagrams relating to various haptic patterns. In each of FIGS. 9A through 13B, a horizontal axis indicates time and a vertical axis indicates voltage. Each vibration waveform indicates vibration strength based on '0' as a voltage with respect to vibration direction (+ or −) over time. The + vibration direction indicates a front direction of the portable terminal 100 and the − vibration direction indicates a rear direction of the portable terminal 100.

Figure 9A:
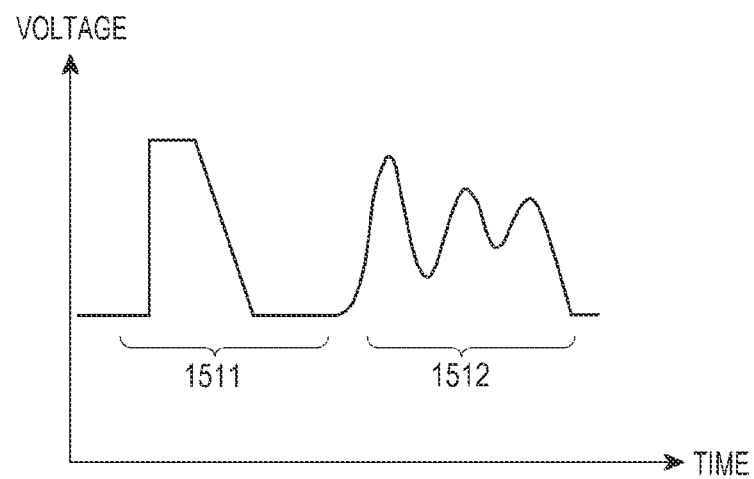
Figure 9B:
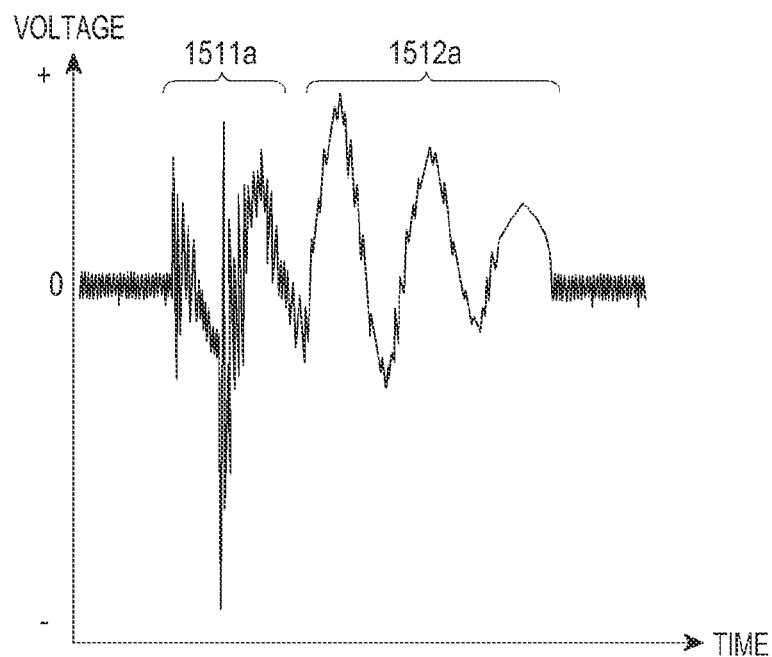

FIG. 9A illustrates a control signal which the controller 110 outputs to the vibration element 164 to generate vibration corresponding to a first haptic pattern 971. FIG. 9B shows a vibration waveform of the vibration element 164.

The control signal is divided into a first signal part 1511 and a second signal part 1512. The first signal part 1511 is applied when a user input means contacts or approaches a local haptic region and the second signal part 1512 is applied when the user input means is spaced apart from or is directed away from the local haptic region.

In the first signal part 1511, as vibration strength in the − direction increases, a resulting vibration gives a dented feeling to the user. In the second signal part 1512, a sine waveform is provided and an amplitude thereof gradually decreases.

The vibration waveform (FIG. 9B) of the vibration element 164 includes a first waveform part 1511a corresponding to the first signal part 1511 and a second waveform part 1512a corresponding to the second signal part 1512. It can be seen that in the first waveform part 1511a, vibration strength in the − direction is very high.

Figure 10A:
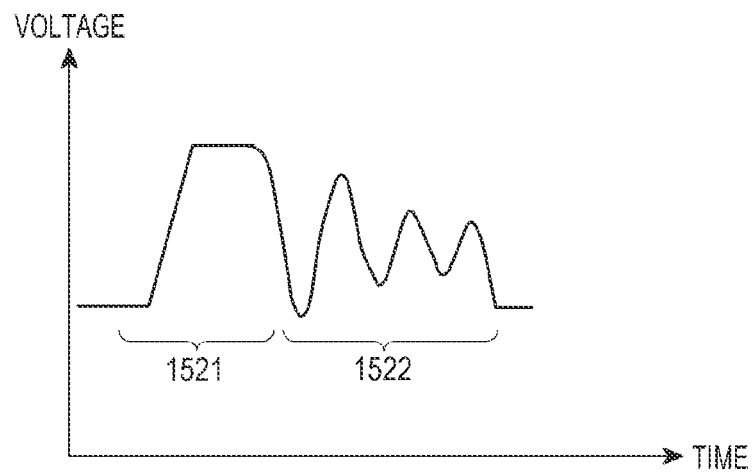
Figure 10B:
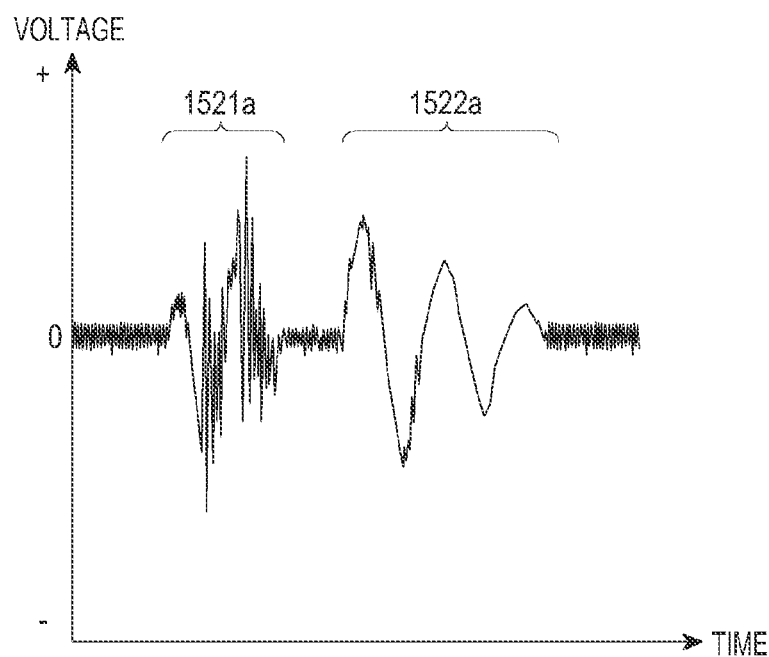

FIG. 10A shows a control signal which the controller 110 outputs to the vibration element 164 to generate vibration corresponding to the second haptic pattern 972. FIG. 10B shows a vibration waveform of the vibration element 164.

The control signal is divided into a first signal part 1521 and a second signal part 1522. The first signal part 1521 is applied when the user input means contacts or approaches a local haptic region and the second signal part 1522 is applied when the user input means is spaced apart from or is directed away from the local haptic region.

In the first signal part 1521, as vibration strength in the + direction increases, a resulting vibration gives a protruding feeling to the user. In the second signal part 1522, a sine waveform is provided and an amplitude thereof gradually decreases.

A drive voltage waveform (FIG. 10B) of the vibration element 164 includes a first waveform part 1521a corresponding to the first signal part 1521 and a second waveform part 1522a corresponding to the second signal part 1522.

Figure 11A:
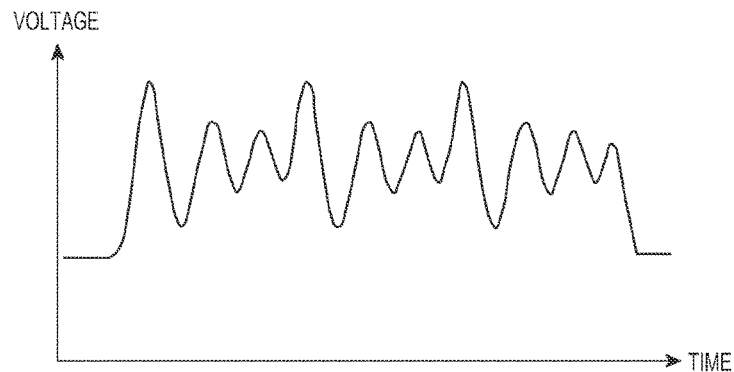
Figure 11B:
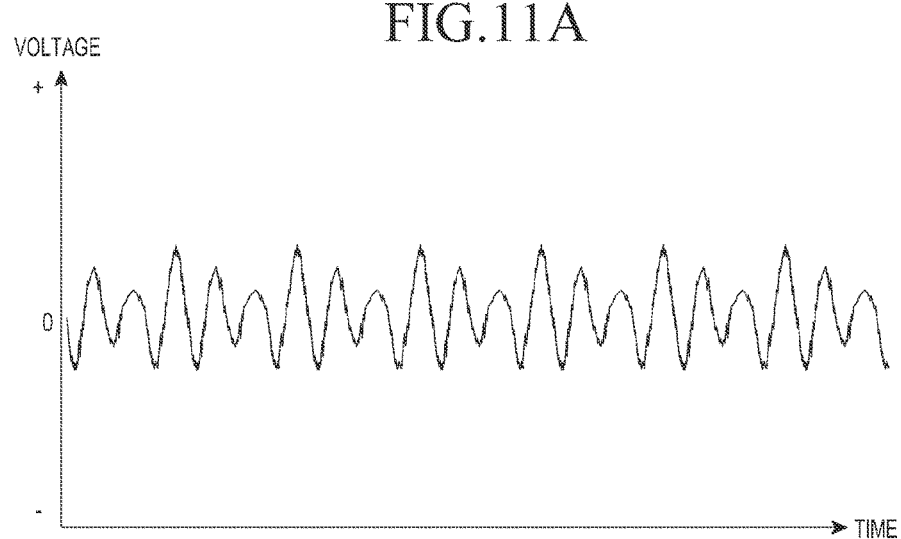

FIG. 11A illustrates a control signal which the controller 110 outputs to the vibration element 164 to generate vibration corresponding to the third haptic pattern 973. FIG. 11B shows a vibration waveform of the vibration element 164.

The control signal has a sine waveform whose amplitude periodically increases and then decreases. A resulting vibration corresponding to the sine waveform whose amplitude periodically increases and then decreases gives a gentle wave feeling to the user.

The vibration waveform (FIG. 11B) of the vibration element 164 is similar to the waveform of the control signal.

Figure 12A:
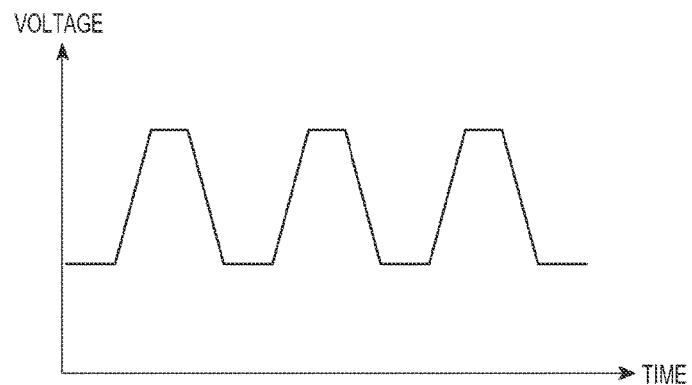
Figure 12B:
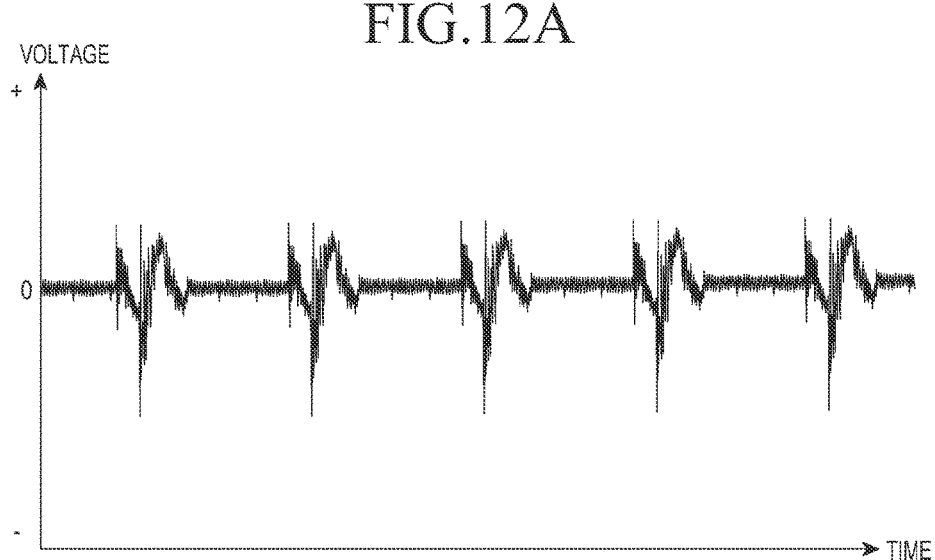

FIG. 12A illustrates a control signal which the controller 110 outputs to the vibration element 164 to generate vibration corresponding to the fourth haptic pattern 974. FIG. 12B shows a vibration waveform of the vibration element 164.

The control signal has a periodic trapezoid, triangle, or saw-toothed waveform. A resulting vibration corresponding to the trapezoid, triangle, or saw-toothed waveform gives a sawing feeling to the user. The waveform (FIG. 12B) of the vibration element 164 is similar to the first waveform part 1511a illustrated in FIG. 9B.

Figure 13A:
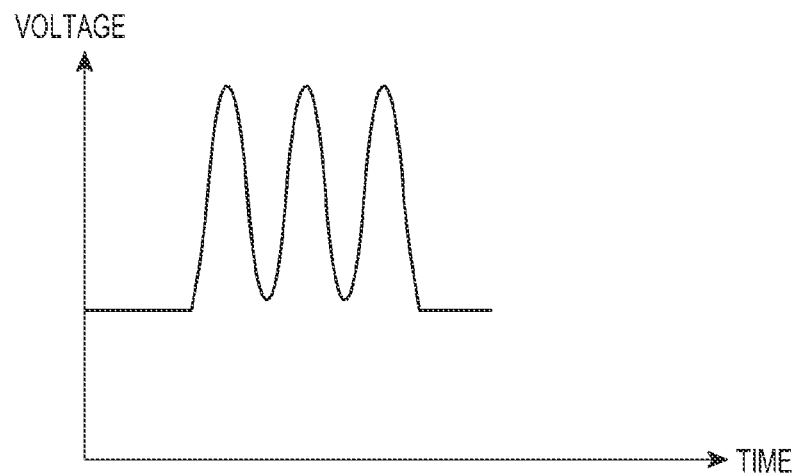
Figure 13B:
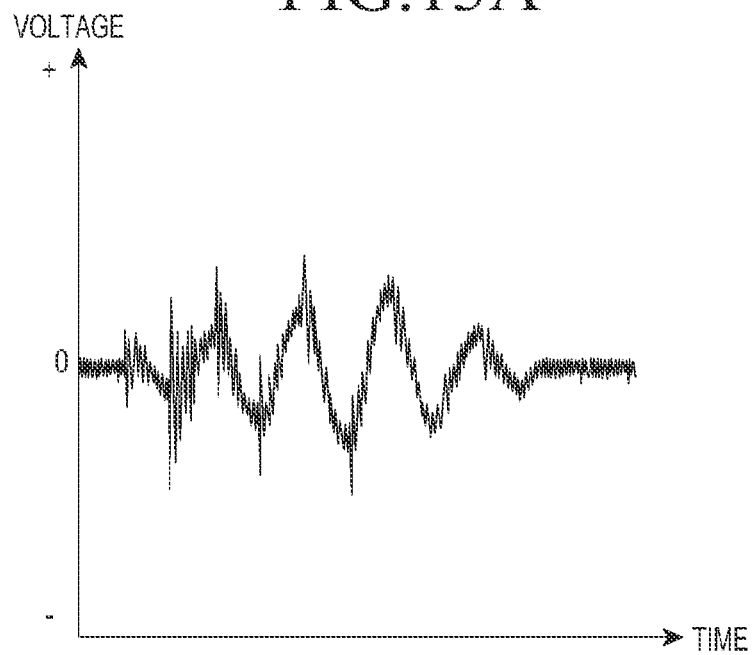

FIG. 13A illustrates a control signal which the controller 110 outputs to the vibration element 164 to generate vibration corresponding to the fifth haptic pattern 975. FIG. 13B illustrates a vibration waveform of the vibration element 164.

The control signal has a periodic sine waveform. A resulting vibration corresponding to the sine waveform gives a short vibration feeling to the user. The drive voltage waveform (FIG. 13B) of the vibration element 164 is similar to the waveform of the control signal.

Step S140 includes determining, by the controller 110, whether the local haptic environment setting is completed or terminated. If the local haptic environment setting is completed, the controller 110 returns to the mode before the setting (in the current example, an application mode) from a local haptic environment setting mode in step S150. If the local haptic environment setting is not completed, the controller returns to step S120 to set a local haptic region.

Referring to FIG. 8B, if the user selects the setting menu 942 (illustrated in FIG. 8A) to set a haptic pattern to be applied to the selected local haptic region, a local haptic environment setting confirm screen 1000 is displayed to the user. On the local haptic environment setting confirm screen 1000, user-set local haptic effect details are arranged and displayed as a first local haptic effect 1010. The first local haptic effect 1010 presents information 1020 indicating that the second haptic pattern giving the protruding feeling to the user is assigned to the pause/play button.

On the local haptic environment setting confirm screen 1000, a menu (or an object) 1030 for setting a next local haptic region and the complete menu 943 are displayed.

If the user selects the object 1030 for setting a next local haptic region, a local haptic environment setting screen 930c is displayed as illustrated in FIG. 8C.

Referring to FIG. 8C, the user selects the region selection menu 941 and sets a desired region. In the current example, the user sets a rewind button as a second local haptic region 1050. Thereafter, the user executes a haptic pattern setting step by selecting the setting menu 942 in the environment setting menu 940.

When the setting menu 942 is selected, a haptic pattern setting screen 1060 is displayed as illustrated in FIG. 14A. An image 1050a selected as the second local haptic region 1050, together with the guide phrase 934 "Set a type of a haptic pattern", is displayed on the haptic pattern setting screen 1060. Selectable first through fifth haptic patterns 971, 972, 973, 974, and 975 are displayed on the haptic pattern setting screen 1060. In the current example, the user selects the first haptic pattern 971 for the selected second local haptic region 1050.

When the user sets a haptic pattern to be applied to the second local haptic region 1050 by selecting the setting menu 942 as illustrated in FIG. 14A, a local haptic environment setting confirm screen 1000a is displayed to the user as illustrated in FIG. 14B. On the local haptic environment setting confirm screen 1000a, user-set local haptic effect details are arranged and displayed as the first local haptic effect 1010 and a second local haptic effect 1012. The first local haptic effect 1010 presents the information 1020 indicating that the second haptic pattern giving the protruding feeling to the user is assigned to the pause/play button.

The second local haptic effect 1020 presents information 1022 indicating that the first haptic pattern giving the dented feeling to the user is assigned to the rewind button.

If the user selects the object 1030 for setting a next local haptic region, the local haptic environment setting screen 930c is displayed as illustrated in FIG. 14C.

The user selects the region selection menu 941 in the environment setting menu 940 and sets a desired region. In the current example, the user sets the fast-forward button as a third local haptic region 1055. Thereafter, the user executes a haptic pattern setting step by selecting the setting menu 942 on the local haptic environment setting screen 930c.

When the setting menu 942 is selected, a haptic pattern setting screen 1060a is displayed as illustrated in FIG. 15A. An image 1055a selected as the third local haptic region 1055, together with the guide phrase 934 "Set a type of a haptic pattern" and the selectable first through fifth haptic patterns 971, 972, 973, 974, and 975, is displayed on the haptic pattern setting screen 1060a. In the current example, the user selects the third haptic pattern 973 for the selected third local haptic region 1055.

When the user sets a haptic pattern to be applied to the third local haptic region 1055 by selecting the setting menu 942, a local haptic environment setting confirm screen 1000b is displayed to the user as illustrated in FIG. 15B. On the local haptic environment setting confirm screen 1000b, user-set local haptic effect details are arranged and displayed as the first local haptic effect 1010, a second local haptic effect 1012, and a third local haptic effect 1014. The first local haptic effect 1010 presents the information 1020 indicating that the second haptic pattern giving the protruding feeling to the user is assigned to the pause/play button, the second local haptic effect 1020 presents the information 1022 indicating that the first haptic pattern giving the dented feeling to the user is assigned to the rewind button, and the third local haptic effect 1014 presents information 1024 indicating the third haptic pattern giving the gentle wave feeling to the user is assigned to a fast-forward button.

When the user selects the complete menu 943 for completing the local haptic environment setting, the music/video application screen 910 is displayed as illustrated in FIG. 15C. That is, upon user's selection of the complete menu 943, the controller 110 returns to the mode before setting (in the current example, the application mode) from the local haptic environment setting mode.

The user may set an application to automatically enter a local haptic feedback providing mode with reference to local haptic environment settings in execution of the application.

Figure 16:
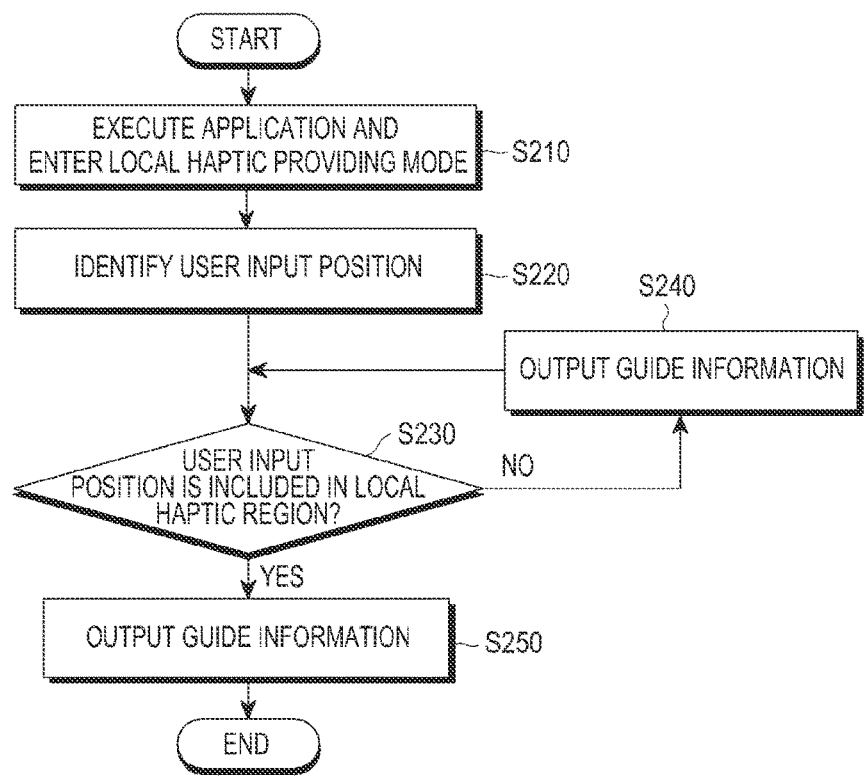
FIG. 16 is a flowchart illustrating a method for providing a local haptic region according to an embodiment of the present invention.

FIG. 16 is a flowchart illustrating a method for providing a local haptic effect according to an embodiment of the present invention. The method for providing the local haptic effect includes steps S210 through S230.

Step S210 includes executing an application and entering the local haptic providing mode, in which the user may execute an application in which the local haptic is set in advance, or the user may enter the local haptic providing mode after executing the application. Alternatively, if the user executes an application, the application may automatically enter the local haptic providing mode with reference to local haptic environment settings. Step S210 corresponds to a process of displaying, on the touch screen, an application screen having the haptic providing region which is set by the user.

To enter the local haptic providing mode, the user may a) press the buttons 161 of the input/output module 160, b) select an icon or a function item through the touch screen 190, c) generate an input of a preset pattern (for example, a double-tap, a motion of putting two fingers which are touching the screen together or apart, or a motion of drawing a circle with a finger which is touching the screen) on the touch screen 190, d) input a voice command through the microphone 162, e) generate a gesture or a motion input through the camera module 150, or f) wirelessly input a particular command through the communication module 120.

Step S220 includes identifying a user input position with respect to the touch screen 190, in which the controller 110 receives a signal including information about the user input position from the touch screen controller 195 and identifies the user input position from the received signal.

Step S230 includes detecting whether the user input position intersects or is included in a local haptic region corresponding to an object provided in the application, in which the controller 110 performs step S250 if the user input position intersects the local haptic region; otherwise, if the user input position is not included in the local haptic region, the controller 110 performs step S240. That is the controller 110 detects whether coordinates of the user input position are included in a coordinates region which define the local haptic region. For example, if the local haptic region is has a quadrilateral shape, the controller 110 may determine whether the coordinates of the user input position are among coordinates of four corners of the local haptic region.

Step S240 includes guiding the local haptic region, in which the controller 110 recognizes an input position of the user input means and outputs guide information for allowing the user input means to quickly move to the local haptic region. The guide information may include information indicating a position or a direction of the local haptic region, a distance between the input position and the local haptic region, and the like. The controller 110 may output the guide information in the form of vibration or sound. The step of guiding the local haptic region is an optional step and thus may be omitted or added. As such, if step S240 is omitted, the controller 110 may stand by until the user input position intersects the local haptic region.

Steps S220 through S240 correspond to a process of detecting a touch in the local haptic region. The touch is input by at least one of a finger including a thumb and the input unit. The touch is input by one of contacting the touch screen and hovering over the touch screen. The local haptic region includes at least one of a key, a button, a text, an image, a shortcut icon, an icon, and a menu displayed on the application screen.

Step S250 includes providing the local haptic, in which the controller 110 controls the input unit 168 and/or the vibration element 164 to generate a vibration corresponding to a haptic pattern which is set in the local haptic region if the user input position intersects the local haptic region. Step S250 corresponds to a process of providing a haptic effect corresponding to the local haptic region in response to the detected touch. The haptic effect has been set by the user. The controller 110 may provide sound, corresponding to the haptic effect, together with the haptic effect.

The function item corresponding to the local haptic region may be selected or executed, together with providing of the haptic effect, or may be selected or executed by an additional touch of the user input means.

The haptic effect may also be provided in the input unit 168. If a touch is generated by a finger (including a thumb, an index finger, or the like), the portable terminal 100 may provide the haptic effect. If a touch is generated by the input unit 168, a control signal corresponding to the touch may be transmitted from the portable terminal 100 to the input unit 168.

The controller 110 provides the haptic effect if the user input means immediately touches the local haptic region. If the user input means does not immediately touch the local haptic region, the controller 110 does not provide the haptic effect and determines a swipe, flick, or drag path of the user input means and continuously determines whether to provide the haptic effect while continuously storing the user input position. That is, the controller 110 continuously tracks the user input position during a swipe of the user input means and continuously determines whether the user input position intersects the local haptic region. In other words, the controller 110 performs a process of detecting continuous movement of a touch and a process of detecting an entrance of the continuous movement into the local haptic region. The haptic effect corresponding to the continuous movement of the touch is not provided at this time.

A pattern of a haptic effect corresponding to the touch and a pattern of a haptic effect corresponding to the entering touch may be different from each other. That is, the function item corresponding to the local haptic region may be selected or executed by an additional touch of the user input means, and a pattern of a haptic effect corresponding to the entering touch made by a swipe in the local haptic region and a pattern of a haptic effect corresponding to an additional touch for execution of the function item may be different from each other. For example, vibration of the protruding feeling may be provided in the entering touch in the local haptic region, and short vibration may be provided in the additional touch for execution of the function item.

If a plurality of local haptic regions (for example, first and second local haptic regions) are set, a haptic effect corresponding to a touch in the first local haptic region and a haptic effect corresponding to a touch in the second local haptic region may be provided differently. For example, in the touch in the first local haptic region, vibration of a protruding feeling may be provided; whereas, in the touch in the second local haptic region, vibration of the dented feeling may be provided.

Figures 17A, 17B:
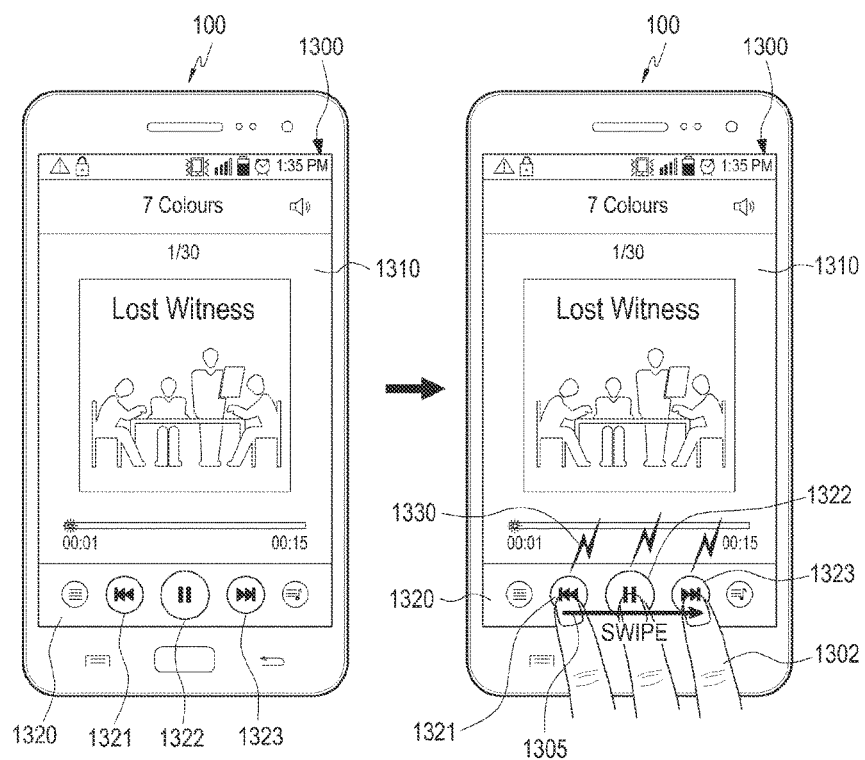
FIGS. 17A and 17B are diagrams relating to a method for providing the local haptic region according to the embodiment of FIGS. 7A to 15C.

FIGS. 17A and 17B illustrate a method for providing the local haptic according to the embodiment of the present invention illustrated in FIGS. 7-15.

Referring to FIG. 17A, the user executes a music/video application, and a music/video application screen 1300 is displayed on the touch screen 190 of the portable terminal 100. A menu 1320 and a playback screen 1310 are displayed on the music/video application screen 1300. The menu 1320 includes a re-wind button corresponding to a first local haptic region 1321, a pause/play button corresponding to a second local haptic region 1322, and a fast-forward button corresponding to a third local haptic region 1323. In the first through third local haptic regions 1321 through 1323, the second haptic pattern giving the user the protruding feeling is set.

Referring to FIG. 17B, the controller controls the input unit 168 and/or the vibration element 164 to generate vibration 1330 corresponding to the haptic pattern set in the local haptic regions 1321 through 1323, if the user input position intersects the local haptic regions 1321 through 1323. As illustrated in FIG. 17B, if a finger 1302, which is an example of the user input means, swipes, flicks, or drags in an arrow direction 1305, then the controller 110 controls the input unit 168 and/or the vibration element 164 to generate the vibration 1330 corresponding to the second haptic pattern each time the finger 1302 passes by each of the local haptic regions 1321 through 1323.

Local haptic region setting may be implemented in various ways, and other examples of local haptic region setting will be described below.

Figure 18:
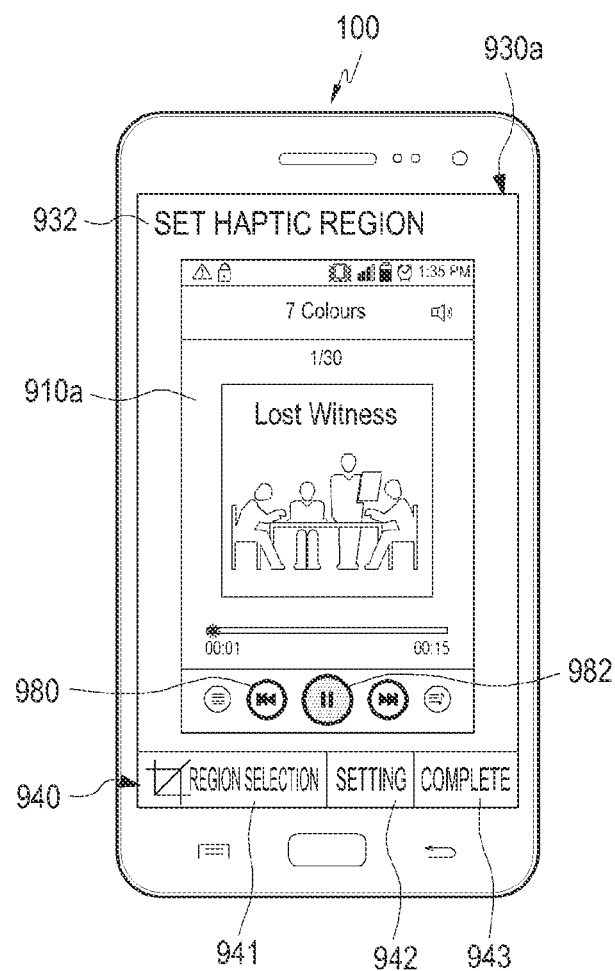
FIG. 18 illustrates a method of setting a local haptic region according to an embodiment of the present invention.

FIG. 18 is a diagram illustrating a method of setting the local haptic region according to an embodiment of the present invention.

Referring to FIG. 18, selectable candidate local haptic regions 980 are primarily highlighted (for example, indicated by a circle with no inner color) on a representative image 910a. If the user selects a desired local haptic region 982, that is, selects a pause/play button by performing a hovering action or a touch action, then the selected local haptic region 982 is secondarily highlighted (for example, indicated by a circle with an inner color filled therein). Such selection is used to mean execution or selection of a menu.

Figure 19:
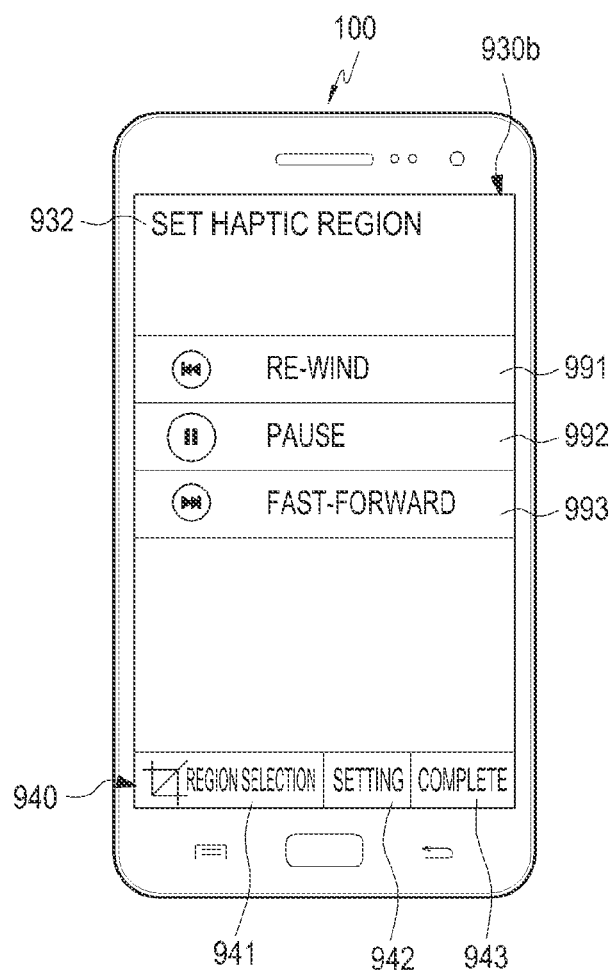
FIG. 19 illustrates a method of setting a local haptic region according to an embodiment of the present invention.

FIG. 19 illustrates a method of setting a local haptic region according to another embodiment of the present invention.

Referring to FIG. 19, a phrase 932 for guiding selection of a local haptic region (e.g., "Set a haptic region.") and selectable candidate local haptic regions 991, 992, and 993 are displayed on a local haptic environment setting screen 930b. In the current example, the first through third candidate local haptic regions 991, 992, and 993 are illustrated, each of which may be displayed with an image and a text describing the image.

The first candidate local haptic region 991 corresponds to the rewind button, the second candidate local haptic region 992 corresponds to the pause/play button, and the third candidate local haptic region 993 corresponds to the fast-forward button.

The environment setting menu 940, which includes the region selection menu 941, the setting menu 942, and the complete menu 943 are displayed on the local haptic environment setting screen 930b. If the user selects the region selection menu 941, the local haptic environment setting screen is displayed. That is, the local haptic environment setting screen may be displayed in an image-based mode (image mode), a text-based mode (text mode), or a combination mode thereof, and the user may switch between the two modes by selecting a preset menu.

Thereafter, the user either selects the setting menu 942 to set a haptic pattern to be applied to the selected local haptic region or selects the complete menu 943 to terminate local haptic environment setting. Local haptic environment settings determined by the user are stored in the storing unit 175.

The disclosed method for setting and providing local haptic according to the present invention may be applied to various applications.

The application may be an arbitrary application, for example, an Operating System (OS), a voice recognition application, a schedule management application, a document creation application, a music application, an Internet application, a map application, a camera application, an e-mail application, an image editing application, a search application, a file search application, a video application, a game application, a Social Networking Service (SNS) application, a call application, and/or a message application.

FIGS. 20A through 22C are diagrams relating to a method for setting and providing local haptic according to another embodiment of the present invention.

Figures 20A, 20B:
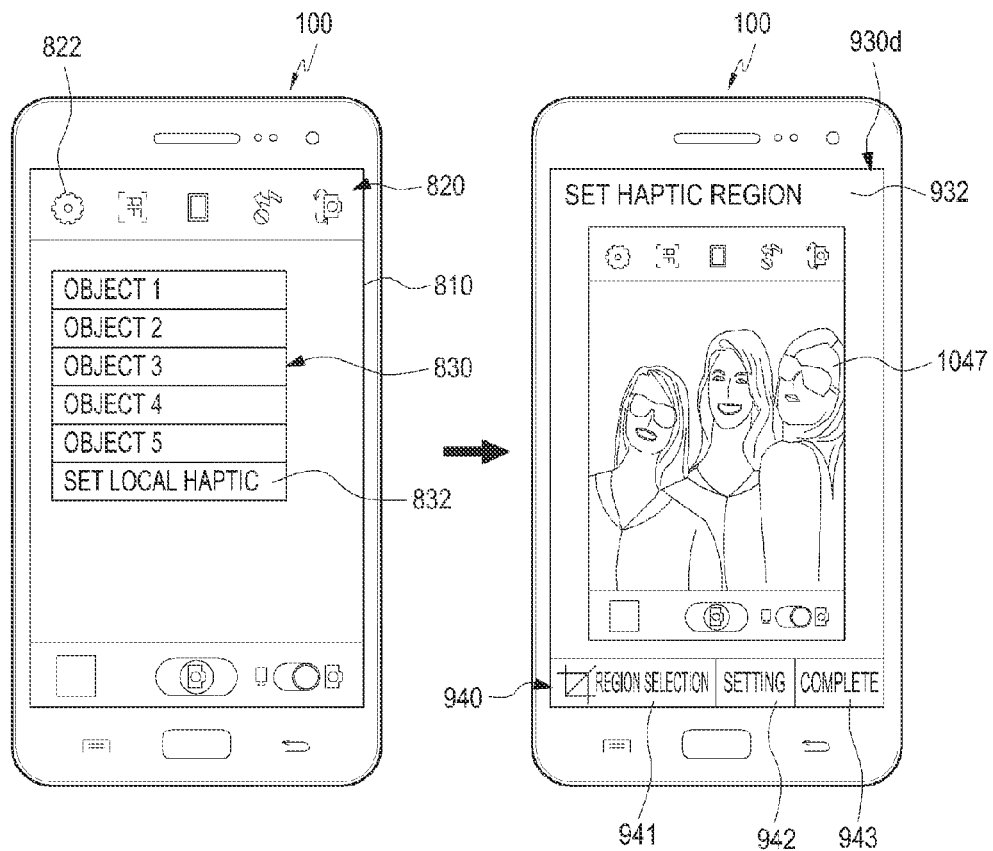

Referring to FIG. 20A, the user executes a camera application and selects an environment setting icon 822 of a camera application screen 810. Environment setting 830, which includes local haptic environment setting 832, is displayed on the camera application screen 810. The user selects the desired local haptic environment setting 832 from among displayed objects.

In this embodiment, to select local haptic environment setting, the user may a) press the buttons 161 of the input/output module 160, b) select an object in another way through the touch screen 190, c) generate an input of a preset pattern (for example, a double-tap, a motion of putting two fingers which are touching the screen together or apart, or a motion of drawing a circle with a finger which is touching the screen) on the touch screen 190, d) input a voice command through the microphone 162, e) generate a gesture or a motion input through the camera module 150, or f) wirelessly input a particular command through the communication module 120.

If the user selects the local haptic environment setting 832, a local haptic environment setting screen 930d for the camera application is displayed as illustrated in FIG. 20B. An image 1047 of the camera application in a size-reduced form is displayed on the local haptic environment setting screen 930d. The phrase 932 for guiding selection of the local haptic region (e.g., "Set a haptic region.") and the environment setting menu 940 are displayed on the local haptic environment setting screen 930d.

Referring to FIG. 21A, the user executes the camera application and a camera application screen 1100 is displayed on the touch screen 190 of the portable terminal 100. A first menu 1110, a second menu 1130, and a capture screen 1120 are displayed on the camera application screen 1100. The first menu 1110 includes an environment setting button, and so forth, and the second menu 1130 includes a capture button corresponding to a local haptic region 1132, and so forth. In the local haptic region 1132, the second haptic pattern giving the protruding feeling is set.

As illustrated in FIG. 21A, the user searches for the local haptic region 1132 set by the user on the camera application screen 1100 with, for example, a finger 1102. The controller 110 continuously determines whether the user input position corresponding to a touch or hovering position of the finger 1102 intersects the local haptic region 1132.

Referring to FIG. 21B, if the user input position intersects the local haptic region 1132, that is, the user touches or approaches the capture button with the finger 1102, then the controller 110 controls the input unit 168 and/or the vibration element 164 to generate vibration 1140 corresponding to the second haptic pattern. The user feels vibration which gives the protruding feeling, and thus the user may recognize that the finger 1102 is touching the capture button or is positioned adjacent to the capture button, without viewing the touch screen 190. For example, since a blind person may have a difficulty in finding and pressing the capture button of a small area, a local haptic region of a larger area is mapped to the capture button to allow the capture button to be selected merely with a touch of a local haptic region, thereby helping the blind person select the button.

Thereafter, the user may capture a scene displayed on the capture screen 1120 by selecting the capture button through a touch motion. In this case, the controller 110 may control the input unit 168 and/or the vibration element 164 to generate vibration corresponding to selection (or click) of the capture button.

In an embodiment different from that illustrated in FIG. 21B, the controller 110 may output guide information.

Referring to FIG. 21C, the controller 110 may output guide information corresponding to a distance between the user input position and the capture button to allow the user to quickly find the capture button corresponding to the local haptic region 1132. In this example, the guide information is presented as vibration 1141, and it is assumed that the current user input position is Pa, the position of the local haptic region 1132 is Pc, and an intermediate position between Pa and Pc is Pb.

Figure 22A:
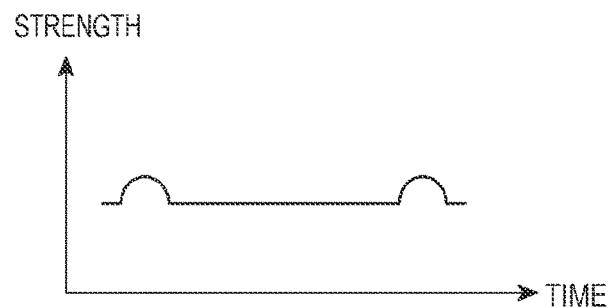
Figure 22B:
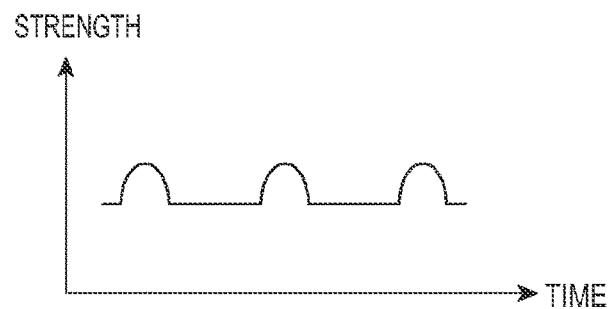
Figure 22C:
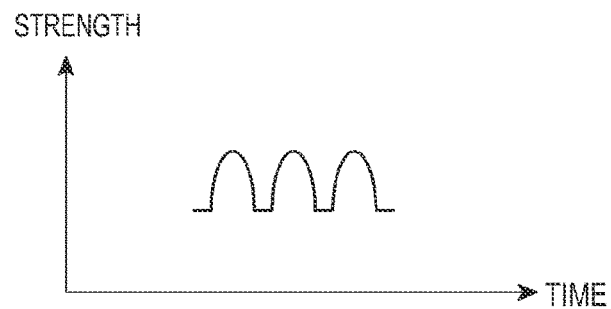

FIG. 22A illustrates vibration in the current user input position Pa. FIG. 22B shows vibration in the intermediate position Pb. FIG. 22C illustrates vibration in the position Pc of the local haptic region 1132. In this case, a horizontal axis indicates time and a vertical axis indicates vibration strength.

Referring to FIGS. 22A through 22C, as the user input position approaches the local haptic region 1132, a vibration interval decreases and a vibration strength increases. Alternatively, as the user input position approaches the local haptic region 1132, the vibration interval increases and the vibration strength decreases.

Alternatively, as the user input position approaches the local haptic region 1132, either the vibration interval or the vibration strength may increase or decrease. Although it is described that vibration for guidance has the second haptic pattern in the current example, vibration for guidance may be in the form of a pulse, which is different from the second haptic pattern.

To allow the user to clearly recognize that the user input position intersects the local haptic region 1132, as the user input position approaches the capture button, the vibration interval decreases and the vibration strength is maintained constant; whereas the vibration strength may sharply increase when the user input position intersects the local haptic region 1132.

Likewise, guide voice, together with or instead of vibration, may be output and, as the user input position approaches the local haptic region 1132, output interval and/or output strength of guidance voice, such as "Capture," may increase or decrease. For example, as the user input position approaches the local haptic region 1132, a time interval between a first output of the voice (e.g., "Cap-") and a second output of the voice (e.g., "-ture") may decrease.

FIGS. 23A through 23C are diagrams relating to a method for setting and providing local haptic according to another embodiment of the present invention.

In this embodiment, the local haptic region may be a region of an image which is recognizable by the controller 110, without being limited to an object such as a menu, a function item, and a button.

Referring to FIG. 23A, a first local haptic region 995 corresponding to a capture button and a second local haptic region 996 corresponding to a subject recognition region (for example, a face or finger recognition region), which is automatically recognized in capturing, are displayed on a local haptic environment setting screen 930e for a camera application. The user may determine whether a desired subject (i.e., at least one user face) is entirely included in a view of the camera module 150 or the subject is properly positioned in capturing, by selecting the second local haptic region 996.

Referring to FIG. 23B, when the user executes the camera application and a camera application screen 1200 is displayed on the touch screen 190 of the portable terminal 100. A first menu 1210, a second menu 1230, and a capture screen 1220 are displayed on the camera application screen 1200. The first menu 1210 includes an environment setting button, and so forth, the second menu 1230 includes a capture button 1232 and so forth. In the current example, a face recognition region is set as a local haptic region 1240.

The controller 110 performs a face recognition process with respect to an image captured by the camera module 150 and, upon completing the face recognition, may output guide information for notifying the user of completion of the face recognition. The controller 110 may output the guide information in the form of vibration or sound.

Referring to FIG. 23C, the controller 110 controls the input unit 168 and/or the vibration element 164 to generate vibration 1250 corresponding to a haptic pattern which is set in the local haptic region 1240, if the user input position intersects the local haptic region 1240. As illustrated in FIG. 23C, if the finger 1202 swipes or drags in an arrow direction 1205, the controller 110 controls the input unit 168 and/or the vibration element 164 to generate vibration 1250 corresponding to the second haptic pattern each time the finger 1202 passes by each face recognition region 1240.

Figure 24A:
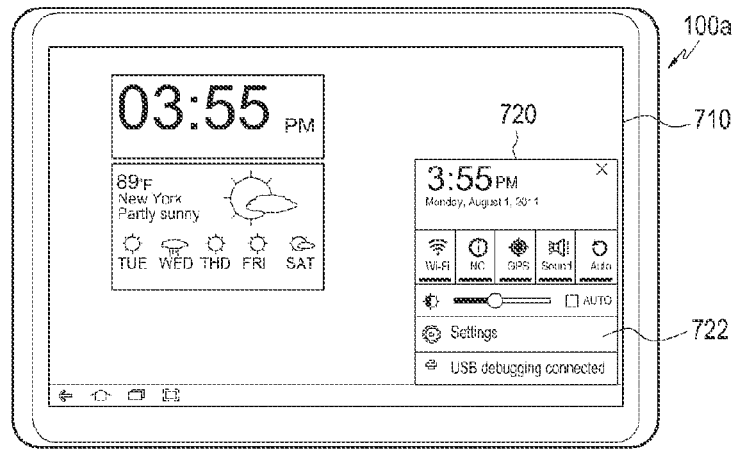
FIGS. 24A through 24C are diagrams relating to a method for setting and providing a local haptic region according to an embodiment of the present invention.
Figure 24B:
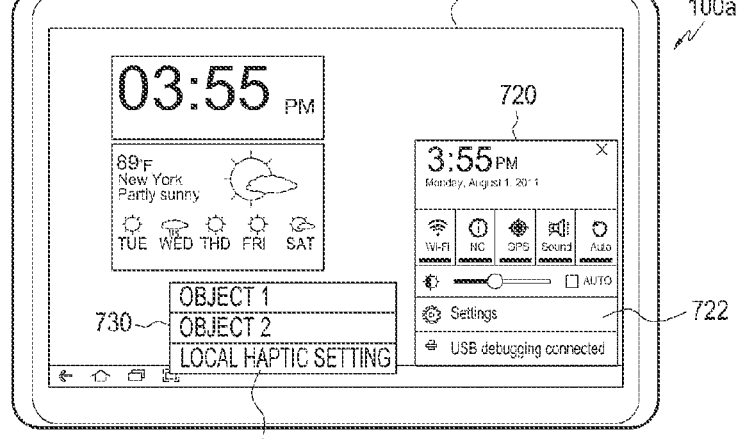
Figure 24C:
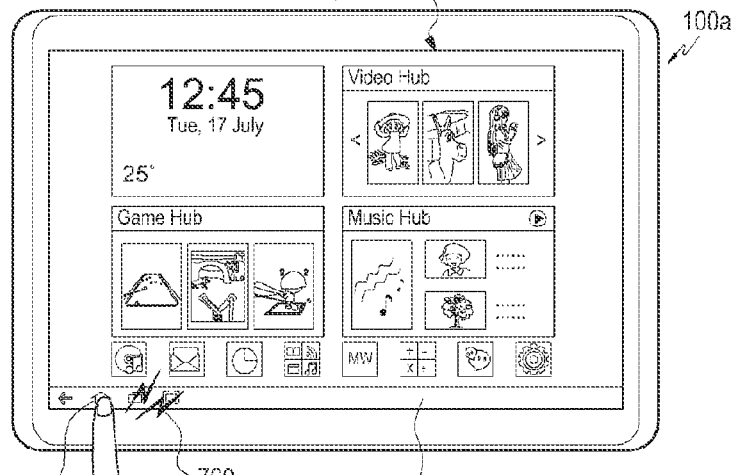

FIGS. 24A through 24C are diagrams relating to a method for setting and providing local haptic according to another embodiment of the present invention.

Referring to FIG. 24A, a main home screen 710 is displayed on a portable terminal 100a and the user selects environment setting 722 in a basic menu 720.

Referring to FIG. 24B, environment setting menu 730 is displayed on the main home screen 710, and displays menus for environment setting. In the present invention, the menu may be referred to as a function item.

The user selects a desired object from among displayed objects. In this embodiment, the user selects local haptic environment setting 732. By selecting the local haptic environment setting 732, the user may assign local haptic to the main home screen 710 or another home screen, that is, for an OS.

Referring to FIG. 24C, the main home screen 740 is displayed on the portable terminal 100a, and a menu 750 or a task bar including a home button corresponding to a local haptic region 752 and other buttons (a back button, a multi-tasking button, a screen capture button, or the like) is displayed in a lower end portion of the main home screen 740.

The controller 110 controls the input unit 168 and/or the vibration element 164 to generate vibration 760 corresponding to a haptic pattern which is assigned to the local haptic region 752, if the user input position intersects the local haptic region 752. As illustrated in FIG. 24C, the user searches for the local haptic region 752 (previously set by the user) on the main home screen 740 with a finger 702. The controller 110 continuously determines whether the user input position corresponding to a touch or hovering position of the finger 702 intersects the local haptic region 752.

If the user input position intersects the local haptic region 752, that is, the user touches or approaches the local haptic region 752 with the finger 702, then the controller 110 controls the input unit 168 and/or the vibration element 164 to generate the vibration 760 corresponding to the second haptic pattern. Since the user feels vibration giving the protruding feeling, the user may recognize that the finger 702 is touching or is positioned adjacent to the local haptic region 752, without viewing the main home screen 740.

Figure 25:
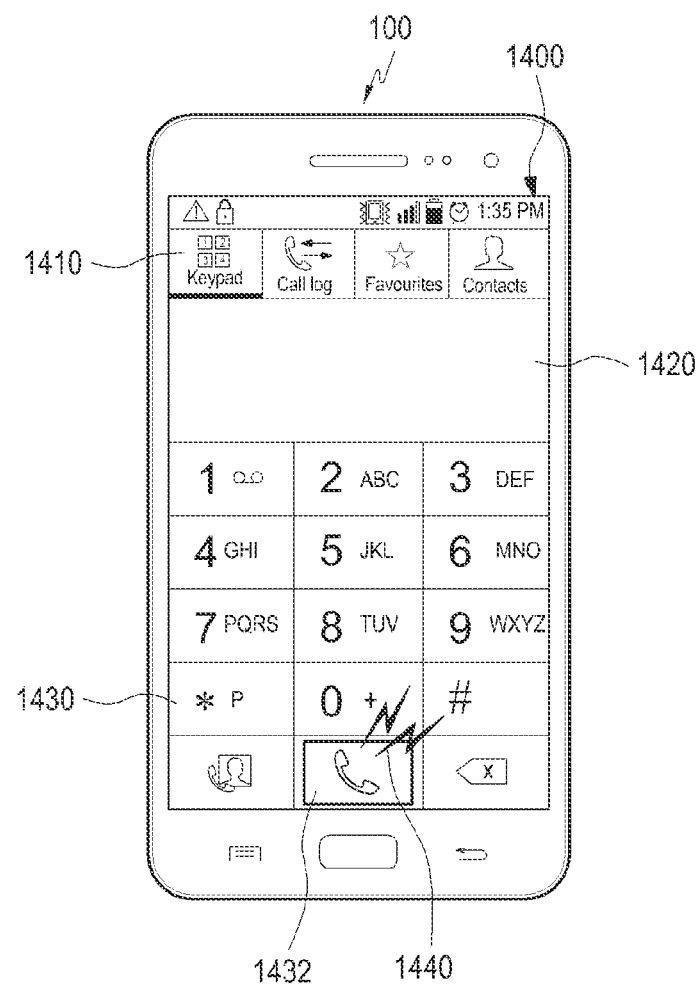
FIG. 25 is a diagram relating to a method for setting and providing a local haptic region according to an embodiment of the present invention.

FIG. 25 is a diagram relating a method for setting and providing local haptic according to another embodiment of the present invention.

The method for setting local haptic for a call application is the same as the method for the above-described applications, and thus the method for providing local haptic will be described.

Referring to FIG. 25, a call application screen 1400 is displayed on the portable terminal 100. The call application screen 1400 may include, for example, a menu 1410 including a keypad, a call log, favorites, contacts, an input window 1420 for inputting a phone number or the like, a keypad 1430 including key buttons for inputting a number, a character, a symbol, and so forth, and a call button corresponding to a local haptic region 1432. In the local haptic region 1432, the second haptic pattern giving the protruding feeling is set.

The controller 110 controls the input unit 168 and/or the vibration element 164 to generate vibration 1440 corresponding to the haptic pattern set in the local haptic region 1432, if the user input position intersects the local haptic region 1432. The user searches for the user-set local haptic region 1432 on the call application screen 1400. The controller 110 continuously determines whether the user input position corresponding to the input position (that is, the touch or hovering position) of the user input means intersects the local haptic region 1432.

If the user input position intersects the local haptic region 1432, that is, the user touches or approaches the local haptic region 1432 with a finger or a pen, then the controller 110 controls the input unit 168 and/or the vibration element 164 to generate the vibration 1440 corresponding to the second haptic pattern. Since the user feels vibration giving the protruding feeling, the user may recognize that the user input means is touching or is positioned adjacent to the local haptic region 1432, without viewing the call application screen 1400.

The above-described embodiments of the present invention provide a haptic effect to the user without a need for viewing a screen, when the user passes an important function in a corresponding application of a conventional smart phone or tablet, such as a capture button of a camera application, a pause/play button, a re-wind button, or a fast-forward button of a music/video application, or a home button of an OS, thereby allowing the user to easily find and using the function. Moreover, according to the present invention, when the user turns over the screen to capture his/her self image in a self-camera mode, the user may easily find the capture button without viewing the screen, and the user on the move may also find and use the re-wind button in the portable terminal kept in the pocket. Moreover, according to the present invention, a handicapped person, when capturing an image, may easily recognize a face recognition result and a position of a face recognition region.

It can be seen that the embodiments of the present invention may be implemented with hardware, software, or a combination of hardware and software. Such arbitrary software may be stored, whether or not erasable or re-recordable, in a volatile or non-volatile storage such as a Read-Only Memory (ROM); a memory such as a Random Access Memory (RAM), a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. It can be seen that the image playback method according to the present invention may be implemented by a computer or a portable terminal which includes a controller and a memory, and the memory is an example of a machine-readable storage medium which is suitable for storing a program or programs including instructions for implementing the embodiments of the present invention. Therefore, the present invention includes a program including codes for implementing an apparatus or method claimed in an arbitrary claim and a machine-readable storage medium for storing such a program. The program may be electronically transferred through an arbitrary medium such as a communication signal delivered through wired or wireless connection, and the present invention properly includes equivalents thereof.

The portable terminal may receive and store the program from a program providing device connected in a wired or wireless manner. The program providing device may include a memory for storing a program including instructions for instructing portable terminal to execute the claimed method for providing a local haptic effect, information necessary for the method for providing the local haptic effect, a communication unit for performing wired or wireless communication with the portable terminal, and a controller for transmitting a corresponding program to the portable terminal at the request of the portable terminal or automatically.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. A method for providing a haptic effect in a portable terminal, the method comprising:
   in response to a first touch input on a shortcut icon displayed on a touch screen, executing an application;
   in response to a second touch input on an executable menu item from among a plurality of executable menu items of the executed application, setting, as a haptic providing region, the touched executable menu item of the executed application;
   in response to a third touch input, setting, from among a plurality of haptic patterns, a haptic pattern to be applied to the haptic providing region;
   displaying an application screen of the application on the touch screen;
   detecting a fourth touch input in the haptic providing region; and
   providing a haptic effect corresponding to the haptic providing region in response to the fourth touch input.

2. The method of claim 1, wherein detecting the fourth touch input comprises:
   detecting a continuous movement of the fourth touch input; and
   detecting an intersection of the continuous movement of the fourth touch input with the haptic providing region.

3. The method of claim 2, wherein a pattern of a haptic effect corresponding to the fourth touch input and a pattern of a haptic effect corresponding to the intersecting touch are different from each other.

4. The method of claim 2, wherein the continuous movement of the fourth touch input comprises at least one of a drag, a flick, and a swipe.

5. The method of claim 1, wherein providing the haptic effect comprises providing sound corresponding to the haptic effect.

6. The method of claim 1, wherein providing the haptic effect comprises transmitting a control signal corresponding to the haptic effect to an input unit.

7. The method of claim 1, wherein a waveform of the haptic effect includes one of a protruding form, a dented form, a sine waveform, and a triangular waveform.

8. The method of claim 1, wherein the haptic providing region is defined by a start position and an end position of the second touch input.

9. A non-transitory machine-readable recording medium having recorded thereon a program for executing a method for providing a haptic effect in a portable terminal, the method comprising:
   in response to a first touch input on a shortcut icon displayed on a touch screen, executing an application;
   in response to a second touch input on an executable menu item from among a plurality of executable menu items of the executed application, setting, as a haptic providing region, the touched executable menu item of the executed application;
   in response to a third touch input, setting, from among a plurality of haptic patterns, a haptic pattern to be applied to the haptic providing region;
   displaying an application screen of the application on the touch screen;
   detecting a fourth touch input in the haptic providing region; and
   providing a haptic effect corresponding to the haptic providing region in response to the fourth touch input.

10. The non-transitory machine-readable recording medium of claim 9, wherein detecting the fourth touch input comprises:
    detecting a continuous movement of the fourth touch input; and
    detecting an intersection of the continuous movement of the fourth touch input with the haptic providing region.

11. The non-transitory machine-readable recording medium of claim 9, wherein providing the haptic effect comprises providing sound corresponding to the haptic effect.

12. The non-transitory machine-readable recording medium of claim 9, wherein providing the haptic effect comprises transmitting a control signal corresponding to the haptic effect to an input unit.

13. The non-transitory machine-readable recording medium of claim 9, wherein a waveform of the haptic effect includes one of a protruding form, a dented form, a sine waveform, and a triangular waveform.

14. The non-transitory machine-readable recording medium of claim 9, wherein the haptic providing region is defined by a start position and an end position of the second touch input.

15. A portable terminal for providing a haptic effect, the portable terminal comprising:
    a touch screen for sensing a user input position and outputting an image;
    a vibration element for generating vibration; and
    a controller for:
       in response to a first touch input on a shortcut icon displayed on a touch screen, executing an application;
       in response to a second touch input on an executable menu item from among a plurality of executable menu items of the executed application, setting, as a haptic providing region, the touched executable menu item of the executed application;
       in response to a third touch input, setting, from among a plurality of haptic patterns, a haptic pattern to be applied to the haptic providing region;
       displaying an application screen of the application on the touch screen;
       detecting a fourth touch input in the haptic providing region; and
       providing a haptic effect corresponding to the haptic providing region in response to the fourth touch.

16. The portable terminal of claim 15, wherein the controller detects continuous movement of the fourth touch input and detects an intersection of the continuous movement of the fourth touch input with the haptic providing region.

17. The portable terminal of claim 16, wherein a pattern of a haptic effect corresponding to the fourth touch input and a pattern of a haptic effect corresponding to the intersecting touch are different from each other.

18. The portable terminal of claim 16, wherein the continuous movement of the fourth touch input comprises at least one of a drag, a flick, and a swipe.

19. The portable terminal of claim 15, wherein the haptic providing region is defined by a start position and an end position of the second touch input.

* * * * *